United States Patent
Nagiyama et al.

(10) Patent No.: US 7,817,168 B2
(45) Date of Patent: Oct. 19, 2010

(54) IMAGE DISPLAY CONTROL APPARATUS AND PROGRAM FOR CONTROLLING SAME

(75) Inventors: Kei Nagiyama, Nagoya (JP); Nobutaka Tauchi, Toyaoke (JP); Keisuke Uto, Tokyo (JP)

(73) Assignee: DENSO CORPORATION, Kariya (JP)

( * ) Notice: Subject to any disclaimer, the term of this patent is extended or adjusted under 35 U.S.C. 154(b) by 705 days.

(21) Appl. No.: 11/725,543

(22) Filed: Mar. 20, 2007

(65) Prior Publication Data

US 2007/0261001 A1 Nov. 8, 2007

(30) Foreign Application Priority Data

Mar. 20, 2006 (JP) ............................. 2006-077048
Feb. 26, 2007 (JP) ............................. 2007-045909

(51) Int. Cl.
*G09G 5/00* (2006.01)
*G06F 3/048* (2006.01)

(52) U.S. Cl. ...................... 345/661; 715/810; 715/815; 715/834

(58) Field of Classification Search ................. 715/834, 715/811, 810, 815; 345/661
See application file for complete search history.

(56) References Cited

U.S. PATENT DOCUMENTS

| | | | | |
|---|---|---|---|---|
| 5,579,037 A | * | 11/1996 | Tahara et al. ................. | 345/173 |
| 5,956,021 A | * | 9/1999 | Kubota et al. ................ | 345/179 |
| 7,559,036 B1 | * | 7/2009 | Buck .......................... | 715/834 |
| 2005/0046890 A1 | * | 3/2005 | Shudo ........................ | 358/1.14 |
| 2005/0289466 A1 | * | 12/2005 | Chen .......................... | 715/731 |

FOREIGN PATENT DOCUMENTS

| | | |
|---|---|---|
| JP | A-7-175820 | 7/1995 |
| JP | A-8-123647 | 5/1996 |
| JP | 09258947 A * | 10/1997 |
| JP | A-2002-2416 | 1/2002 |
| JP | A-2004-38894 | 2/2004 |
| JP | A-2004-70829 | 3/2004 |

* cited by examiner

*Primary Examiner*—Ryan R Yang
(74) *Attorney, Agent, or Firm*—Posz Law Group, PLC

(57) ABSTRACT

In a display screen of an image display device, plural menu items in a higher rank menu hierarchy are displayed in a first circular arrangement, and plural menu items in a lower rank menu hierarchy that is subsidiary to the higher rank menu hierarchy is displayed in a second circular arrangement that concentrically surrounds the first circular arrangement with a greater diameter than the first circular arrangement. In addition, a pointed-out portion in the display screen is identified according to a user operation to an operation device, and a function of a menu item in the lower rank menu hierarchy being in association with the identified pointed-out portion is realized by a processing for the function. Each of the menu items in the lower rank menu hierarchy is arranged in a position in a manner that expresses the subordination of the lower rank menu item to one of the menu items in the higher rank menu hierarchy.

17 Claims, 19 Drawing Sheets

IMAGE DISPLAY CONTROL APPARATUS AND PROGRAM FOR CONTROLLING SAME

CROSS REFERENCE TO RELATED APPLICATIONS

This application is based on and incorporates herein by reference Japanese Patent Applications No. 2006-77048 filed on Mar. 20, 2006, and No. 2007-45909 filed on Feb. 26, 2007.

FIELD OF THE INVENTION

The present invention relates to an image display control device and a program for the image display control device.

BACKGROUND INFORMATION

Devices for displaying multiple images in a display screen of an image display device are being widely used. For example, a navigation device displays various images such as maps and hierarchical menus in an image display device. For example, a personal computer displays various images such as icons and windows in an image display device.

SUMMARY OF THE INVENTION

An object of the present invention is to provide an image display control device for displaying images having new forms in an image display device.

In an image display control device of the present disclosure, the following operations are executed. Multiple upper images are displayed in multiple upper areas in a display screen of an image display device. Multiple lower images are displayed in multiple lower areas in the display screen. A pointed portion pointed in the display screen is specified in accordance with an operation of an operating device by a user. A function corresponding to the lower image determined in accordance with the specified pointed portion is achieved. In this case, the multiple lower areas are respectively contained in multiple lower angle ranges contained in any one of multiple upper angle ranges around an origin in the display screen. The multiple upper areas are respectively contained in the multiple upper angle ranges. Each of the multiple upper areas is nearer to the origin than multiple subordinate lower areas of the plurality of lower areas, the subordinate lower areas being contained in the upper angle range corresponding to the each of the multiple upper areas. Each of the multiple upper images is an image that represents functions of the subordinate lower areas of the upper area corresponding to the each of the multiple upper images.

In the control by such an image display control device, the upper images are displayed around the origin in the display screen of the image display device. The lower images corresponding to the function represented by each of the upper images are displayed in almost the same direction from the origin as the upper image, and at a position further from the origin than that of the upper image. Accordingly, the user can find the lower image for a target function easily by moving his or her eye from the origin toward the upper image representing the target function when specifying part of the display screen for properly calling functions of the displayed lower images. In other words, the upper image is a guide to the position of the target lower image.

As the user learns the operation of the image display device, the user can acquire a sense about in which direction and what function is displayed, such as the so-called locality. Accordingly, the user can find the lower image corresponding to the target function more easily.

The image display control device of the present disclosure displays a plurality of upper images in a plurality of upper areas in a display screen of an image display device, displays a plurality of middle images in a plurality of middle areas in the display screen, and displays a plurality of lower images in a plurality of lower areas in the display screen. The image display control device specifies a pointed portion pointed in the display screen in accordance with an operation of an operating device by a user; and achieves a function corresponding to a lower image based on the specified pointed portion, the lower image being in the plurality of lower images.

The multiple lower areas are respectively contained in multiple lower angle ranges contained in any one of multiple middle angle ranges contained in any one of multiple upper angle ranges around an origin in the display screen. The multiple middle areas are respectively contained in the multiple of middle angle ranges. Each of the multiple middle areas is nearer to the origin than multiple subordinate lower areas of the multiple lower areas, the subordinate lower areas being contained in the middle angle range corresponding to the each of the plurality of middle areas. The multiple upper areas are respectively contained in the multiple upper angle ranges. Each of the multiple upper areas is nearer to the origin than multiple subordinate middle areas of the multiple middle areas, the subordinate middle areas being contained in the upper angle range corresponding to the each of the multiple upper areas. Each of the multiple middle images is an image that represents functions of multiple subordinate lower areas of the middle area corresponding to the each of the multiple middle images. Each of the multiple upper images is an image that represents functions of the multiple subordinate lower areas of the multiple subordinate middle areas of the upper area corresponding to the each of the multiple upper images.

In such a control by the image display control device, the upper images are displayed around the origin in the display screen of the image display device. Additionally, the multiple middle images are displayed in the substantially same direction from the origin as the upper image, and further from the origin than the upper image, in the image display device. The lower images corresponding to the function represented by each of the middle images are displayed in the substantially same direction from the origin as the middle image, and further from the origin than the upper image. Each upper image is an image that represents functions of the lower images located in the substantially same direction from the origin as the upper image. Accordingly, when specifying a portion in the display screen to call a target function of the displayed lower image properly, the user can easily find a lower image for the target function by moving his/her eyes from the origin in the direction of the upper image representing the target function, and more specifically from the upper image to the middle image representing the target function. In other words, the upper image and middle image are a two-step guide to the position of the lower image.

As the user learns the operation of the image display device, the user can acquire a sense about in which direction and what function is displayed, such as the so-called locality. Accordingly, the user can find the lower image corresponding to the target function more easily.

In the invention of the present disclosure, the image display control device for displaying multiple menu images in multiple partial areas in the display screen of the image display device can specify that a pointed portion in the display screen is pointed by a first method in accordance with an operation of an operating device by the user, and specify that the pointed portion is pointed by a second method after by the first method. The image display control device achieves a function corresponding to one menu image determined based a position of the pointed portion, the one menu image being in the multiple menu images, when the pointed portion is specified by the second method. The image display control device enlarges part of the multiple menu images, the part being near the position of the pointed portion, at an enlargement scale based on the position of the pointed portion, when the pointed portion is specified by the first method.

Accordingly, the image display device for achieving a function of the menu image corresponding to the portion pointed by the second method (for example, selection determination) after by the first method enlarges the menu image at an enlargement scale based on the position of the portion pointed by the first method (for example, movement of a pointer). As a result, the menu can be searched easily, and an operation can be done easily to achieve the function corresponding to the menu image.

In the image display control device of the present disclosure, when the pointed portion is pointed by the first method, and when the pointed portion extends over multiple menu images, the display control unit preferably enlarges the multiple menu screens over which the pointed portion extends. Accordingly, the user can point a target image around the pointed portion easily.

In the invention of the present disclosure, the image display control device displays multiple menu images in multiple partial areas in the display screen of the image display device together with an image (hereinafter called background image) behind the menu images. The image display control device specifies that a pointed portion in the display screen is pointed by a first method, and specifies that the pointed portion is pointed by a second method after by the first method. The image display control device achieves a function corresponding to one menu image determined based on a position of the pointed portion the one menu image being in the multiple menu images, when detecting that the pointed portion is specified by the second method. The image display control device switches content of the background image to be displayed to content relating to the function of the one menu image when detecting that the pointed portion is specified by the first method. Accordingly, the user can easily understand a function of the menu image corresponding to the pointed portion before the function is achieved.

The image display control device of the present disclosure displays multiple images on the display screen of the image display device. The image display control device specifies a pointed portion pointed in the display screen in accordance with an operation of an operating device by the user. The image display control device achieves a function corresponding to an image based on the pointed portion specified by the pointed portion specifying unit, the image being in the multiple images. The image display control device detects a new additional function which becomes executable, adds an additional image corresponding to the detected additional function to the multiple images, and displays the additional image and the multiple images on the image display device. The image display control device achieves the additional function when the image based on the specified pointed portion is the additional image.

Accordingly, the image display control device can display a new additional image for receiving an operation by the user to achieve a new function in response to addition of the function.

The image display control device of the present disclosure displays multiple images on the display screen of the image display device. The image display control device specifies a pointed portion pointed in the display screen in accordance with an operation of an operating device by the user. The image display control device achieves a function corresponding to an image based on the pointed portion, the image being in the multiple images, and records a history of achieved functions on a storage medium. The image display control device highlights an image of a function having a higher achievement frequency in accordance with the history of the functions corresponding to the multiple images when displaying the multiple images. Accordingly, the image corresponding to a function having a higher usage frequency is more visible. As a result, as the user continues using the image display control device longer, the image corresponding to a favorite function can be found more easily.

In the image display control device of the present disclosure, the operating device includes a first operating device for receiving an instruction by a hand of the user and a second operating device for receiving an instruction by speech of the user. The function achieving unit records a history of functions achieved by the instruction by the hand of the user and a history of functions achieved by the instruction by the speech of the user separately. When an instruction is done by the user by use of one of the first operating device and second operating device, the display control unit preferably highlights an image corresponding to a function having a high achievement frequency in accordance with the history of the used operating device. This is because a function having a high usage frequency sometimes varies between when an instruction is done by the hand and when an instruction is done by speech.

As described in the present disclosure, in accordance with the separately recorded histories, the image corresponding to the function achieved by an instruction by the hand of the user and having a high usage frequency and the image corresponding to the function achieved by an instruction by speech of the user and having a high usage frequency may be highlighted differently.

The image display control device of the present disclosure displays multiple images respectively corresponding to multiple partial areas placed in a two-dimensional coordinate plane similarly to placement of the multiple partial areas. The image display control device of specifies a pointed portion pointed in the two-dimensional coordinate plane in accordance with an operation of an operating device by the user. The image display control device achieves a function corresponding to a partial area based on the specified pointed portion. Each of the multiple partial areas is a lower area contained in any one of multiple lower angle ranges into which each of multiple upper angle ranges around an origin in the two-dimensional coordinate plane is split. The image display control device displays an image representing functions of multiple subordinate lower areas (namely subordinate lower areas) of the multiple lower areas in an upper area which is contained in each of the multiple upper angle ranges and which is nearer to the origin than the subordinate lower areas contained in each of the multiple upper angle ranges.

In such a control by the image display control device, the image display device displays the upper images in the display screen, and displays the lower images corresponding to the functions represented by each of the upper images in the same direction from a point (hereinafter called a reference point) corresponding to the origin in the two-dimensional plane as the upper image, and further from the reference point than the upper image. Accordingly, when specifying part in the display screen to call a function of the lower image shown as described above, the user can easily find the lower image for the target function by moving his or her eye from the reference point to the upper image representing the function. In other words, the upper image is a guide to a position of the lower image.

As the user learns the operations of the image display device, the user can acquire a sense about in which direction and what function is displayed relative to the center of the screen, such as the so-called locality, to easily find the lower image corresponding to the target function.

As described in the present disclosure, the image display control device may control a scale of placement of the multiple images relative to placement of the multiple lower areas and the multiple upper areas in the display screen in accordance with a position of the specified pointed portion. Accordingly, the lower image for the target function is easily found.

The image display control device of the present disclosure displays multiple upper menu items belonging to an upper hierarchy on a first circumference, and displays multiple lower menu items belonging to a lower menu hierarchy subordinate to the upper menu hierarchy on a second circumference coaxial to the first circumference and larger than the first circumference, in the display screen of the image display device. The image display control device specifies a pointed portion pointed in the display screen in accordance with an operation of an operating device by the user. The image display control device achieves a function corresponding to a function corresponding to one lower menu item determined based on the specified pointed portion in the multiple lower menu items. The multiple upper menu items and the multiple lower menu items are placed such that a direction from a center of the second circumference to each of the multiple lower menu items is near to a direction from the center to an upper menu item to which the multiple lower menu item belongs, the upper menu item being in the upper menu items.

The upper menu items and lower menu items are located coaxially in the display screen in such a structure, so that the user can find the target lower image. At this time, to specify part of the display screen for calling a function of the lower menu item, the user finds the lower menu item for the target function by transferring his or her eye from the center of the concentric circle in the direction of the upper menu item containing the target function, and from the direction of the upper menu item to the lower menu item representing the target function. In other words, the upper image and middle image are a two-step guide to the lower image.

As the user adjusts to the operation of the image display device, the user can learn a sense about in which direction and what function is displayed, such as the so-called locality. Accordingly, the user can find the lower image corresponding to the target function more easily.

In the invention of the present disclosure, the image display control device displays an image in the display screen of the image display device. The image display control device specifies a pointed portion pointed in the display screen in accordance with an operation of an operating device by the user. The image display control device enlarges the pointed portion of the image and a surrounding of the pointed portion at a scale based on a position of the specified pointed portion.

The image display control device of the present disclosure comprises pointed portion specifying unit for specifying a portion pointed (hereinafter called a pointed portion) in the display screen in accordance with an operation of an operating device by the user; display control unit for displaying multiple items (hereinafter called upper menu items) belonging to an upper menu hierarchy on surfaces of a polyhedron displayed stereoscopically in the display screen, and for changing a shape of the polyhedron when the pointed portion specified by the pointed portion specifying unit corresponds to any one of the upper menu items, and displaying multiple items (hereinafter called lower menu items) belonging to a lower item hierarchy under the selected upper menu item on the changed shape; and function achieving unit for achieving a function corresponding to one lower menu item determined based on the pointed portion specified by the pointed portion specifying unit, the one lower menu item being in the multiple lower menu items.

Accordingly, only the upper menu items are displayed in the display screen at first, so that the user views the upper menu items easily, and thus finds the upper menu item including a target function as the lower menu item easily. When the pointed portion specified by the pointed portion specifying unit corresponds to one of the upper menu items, the shape of the polyhedron whose surfaces show the upper menu items changes. After the change of the shape, the lower menu items are displayed. Accordingly, the user can recognize that the lower menu items are displayed while enjoying the change.

The present invention can be understood as a program for achieving operation of the image display control device as described above. The present invention can also be understood as a program for achieving operation of the image display control device as described above. The present invention can also be understood as a program for achieving operation of the image display control device as described above. The present invention can also be understood as a program for achieving operation of the image display control device as described above. The present invention can also be understood as a program for achieving operation of the image display control device as described above. The present invention can also be understood as a program for achieving operation of the image display control device as described above. The present invention can also be understood as a program for achieving operation of the image display control device as described above. The present invention can also be understood as a program for achieving operation of the image display control device as described above. The present invention can also be understood as a program for achieving operation of the image display control device as described above. The present invention can be understood as a program for achieving operation of the image display control device as described above.

BRIEF DESCRIPTION OF THE DRAWINGS

Other objects, features and advantages of the present invention will become more apparent from the following detailed description made with reference to the accompanying drawings, in which.

DETAILED DESCRIPTION

Embodiments of the present invention are described with reference to the accompanying the drawings.

Figure 1:
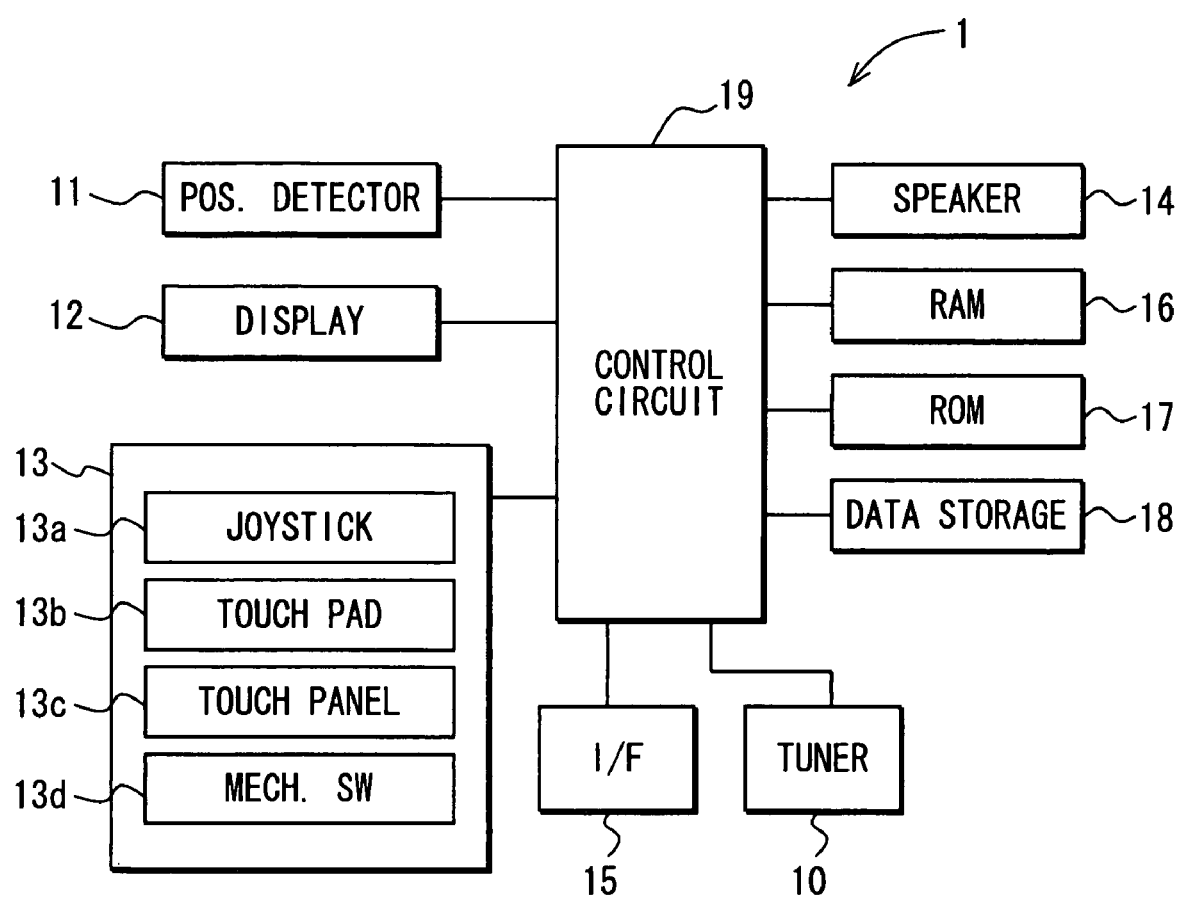
FIG. 1 shows a hardware structure of a vehicular navigation device 1 of an embodiment of the present invention.

One embodiment of the present invention is explained below. FIG. 1 shows a hardware structure of a vehicular navigation device 1 of this embodiment. The vehicular navigation device 1 includes a tuner 10, a position detector 11, an image display 12, an operating section 13, a speaker 14, an interface 15, an RAM 16, an ROM 17, a data storage section 18, and a control circuit (corresponding to one example of a computer) 19.

The tuner 10 receives, by radio, a broadcast signal from a TV station or radio station specified by a user, and outputs the signal to the control circuit 19.

The position detector 11 includes sensors such as an earth magnetism sensor, a gyroscope, a speed sensor, and a GPS receiver, these components being well known but not shown. The position detector 11 outputs information which is based on characteristics of these sensors, and used for specifying a current position and direction of a vehicle, to the control circuit 19. The image display device 12 displays a video based on a video signal outputted from the control circuit 19.

The operating section 13 includes multiple operating devices. The operating devices are operated by the user, and output signals to the control circuit 19 in accordance with the received operations. More specifically, the operating section 13 includes a stick type input device 13a, a touch pad 13b, a touch panel 13c, and a mechanical switch 13d.

The stick type input device 13a has a stick shaped grip. The user tilts the grip in one of the four directions, backward, forward, right, and left directions (or in the eight directions where four middle directions between the backward, forward, right, and left directions are added). Then, in accordance with the direction and angle of the tilted grip, the stick type input device 13a outputs signals to the control circuit 19. The touch pad 13b has a contact surface, with which objects such as fingers of the user contact. The touch pad 13b outputs signals in accordance with a signal showing that an object has come in contact with the contact surface, and with a direction of movement of the object. The touch panel 13c overlies on the display surface of the image display device 12, and outputs signals to the control circuit 19 in accordance with a position where the touch panel 13c is touched. The mechanical switch 13d is disposed to a predetermined position around the image display device 12, and outputs signals when the user pushes the mechanical switch 13d.

The operating devices are not limited to the above components. For example, instead of the stick type input device 13a, the so-called haptic input device having a reaction control function in which a reaction force is provided against a movable operating portion in accordance with an operating amount of the operating portion (a distance and direction of the movement) may be used. As the operating device, a voice recognition unit may be provided for receiving a speech instruction from the user.

The interface 15 includes connectors for receiving and transmitting data from and to other devices. The control circuit 19 is connected to an air conditioner in a user's vehicle via one connector of the interface 15. The interface 15 includes a connector to which an outer device such as a mobile music player can be connected.

The data storage section 18 includes a device for reading data from (and, if possible, writes data onto) nonvolatile storage mediums such as DVDs, CDs, MDs, HDDs, and flash memories. The data storage section 18 stores a program executed by the control circuit 19, road map data for guiding routes, music data, moving picture data, and menu map data. The road map data includes positions and types of links of roads and nodes of intersections, road data including relationships among the nodes and links, and facility data including attributions such as names, locations, phone numbers, and zip codes of facilities on a map. The menu map data is explained later.

The control circuit 19 (corresponding to a computer) executes a program for operating the vehicular navigation device 1. The program is read from the ROM 17 and data storage section 18. In the execution, the control circuit 19 reads information from the RAM 16, ROM 17, and data storage section 18, and writes information onto the RAM 16 and data storage section 18. Then, the control circuit 19 receives and sends signals from and to the position detector 11, image display device 12, operating section 13, speaker 14, and interface 15.

More specifically, the control circuit 19 executes the program for current position specifying processes, guide route calculations, route guides, music playing, moving picture playing, radio outputting, television outputting, air conditioning, and menu processes.

In the current position specifying process, a current position and direction of a vehicle is specified using the known technique such as map matching in accordance with signals from the position detector 11. In the guide route calculation, an optimum guide route from a current position to a destination set by the user is calculated. The route guide is as follows. Map data is read from the data storage section 18. An image showing a calculated guide route, a set destination, routing points, and a current position overlaid on a map shown by this map data is outputted to the image display device 12. For example, when the user's vehicle reaches a guide intersection, a guide speech signal instructing a right turn or left turn is outputted from the speaker 14. The current position specifying process and route guide are achieved as functions of the navigation control.

In the music playing process, part of multiple music data (for example, data of MPEG1 Layer3) is read, and in accordance with the read music data, an audio signal is outputted from the speaker 14. In the moving picture playing process, part of multiple moving picture data recorded in the data storage section 18 is read, and in accordance with the read moving picture data, a moving picture is displayed from the image display device 12. In the radio receiving and outputting process, the tuner 10 receives a broadcast signal from a radio station, and in accordance with the received broadcast signal, an audio signal is outputted from the speaker 14. In the television receiving and outputting process, the tuner 10 receives broadcast signals from a TV station, displays videos on the display 12 in accordance with the received broadcast signals, and outputs audio signals to the speaker 14 in accordance with the broadcast signals. These processes achieve an audio-visual control function. More specifically, the music playing process and radio receiving and outputting process are audio control functions, and the moving picture playing process and television receiving and outputting process are visual control processes.

In the air conditioning process, operations of the air conditioner in the user's vehicle are controlled via the interface 15. As the operations, for example, the air conditioner is turned on and off, a temperature of the air is regulated, an amount of the air is regulated, and the inside air mode and outside air mode are switched. This process is executed for the air conditioning.

Figure 2:
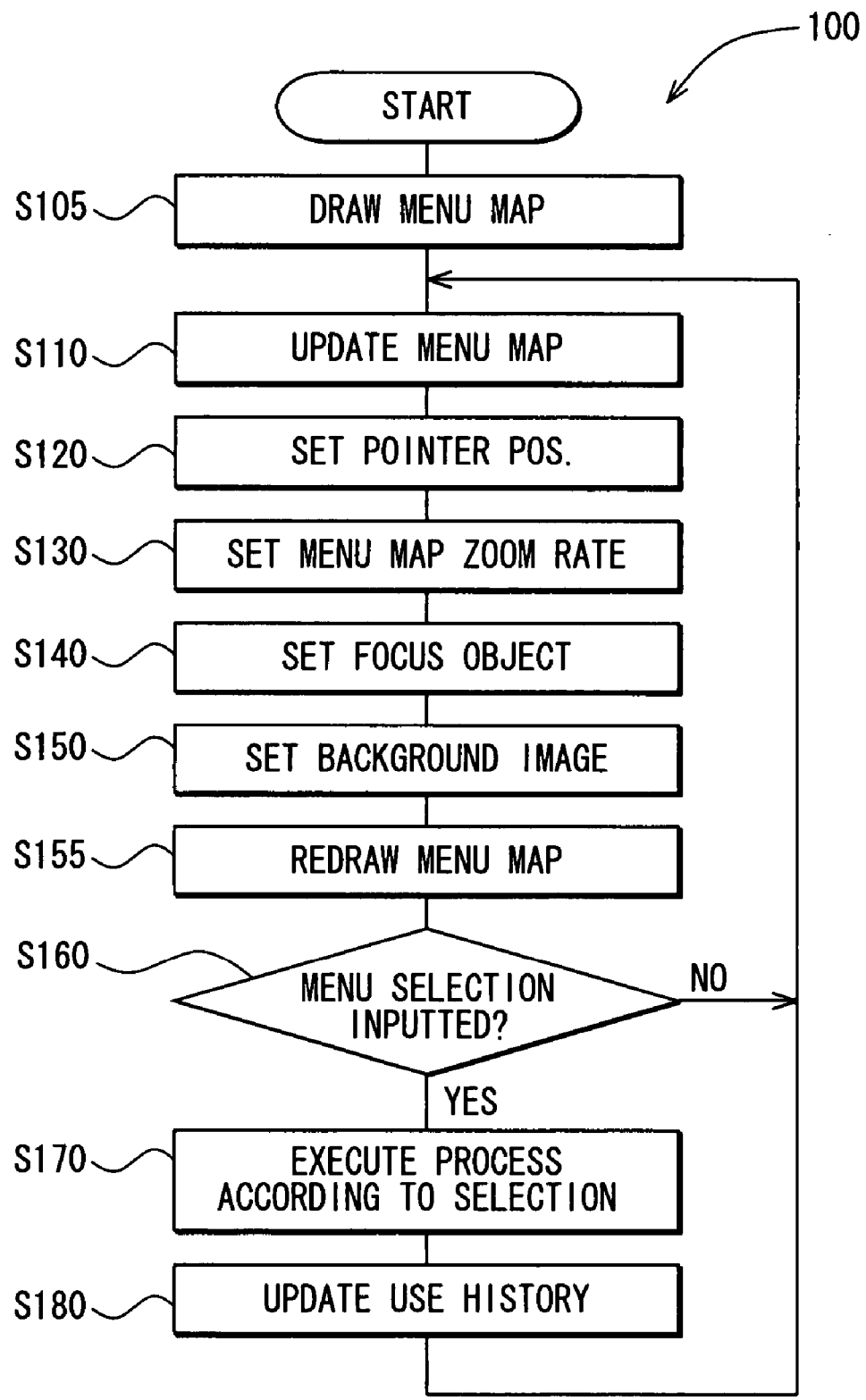
FIG. 2 shows a flowchart of a menu program 100 executed by a control circuit 19 of the vehicular navigation device 1.

The menu process is executed for receiving user settings for the navigation control, audio-visual control, and air conditioning. When the control circuit 19 detects that an operation of starting the menu process is done to the operating section 13, the control circuit 19 starts executing a menu program 100 shown in FIG. 2 for the menu process.

Figure 3:
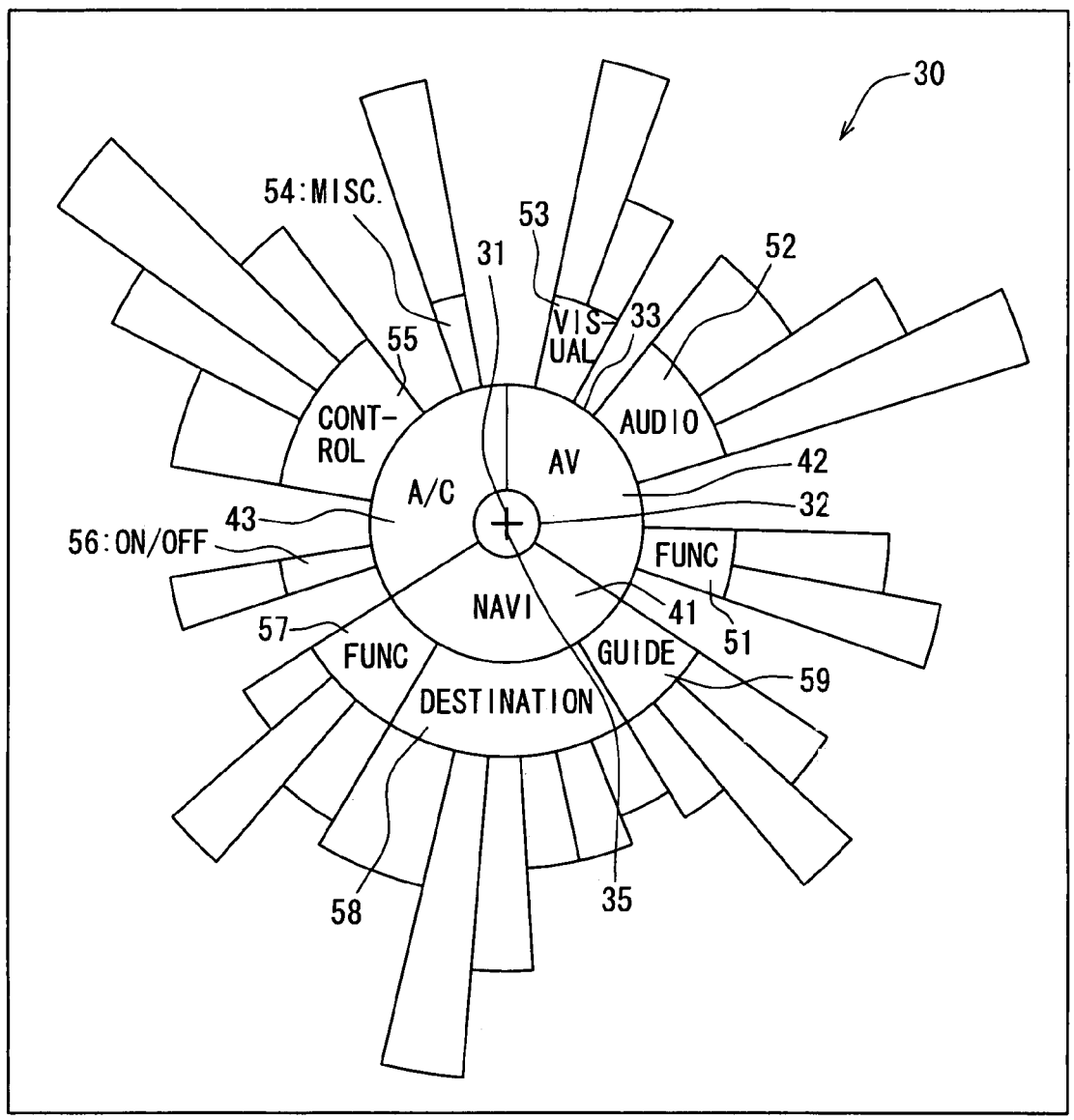
FIG. 3 shows an overall view of a menu map 30.

In the execution of the menu program 100, first in Step S105, the control circuit 19 displays a menu map at an initial scale on the image display device 12. The menu map shows that multiple areas on a virtual two-dimensional plane (hereinafter called a virtual plane) correspond to multiple menu items respectively. The menu items are one group having one tree structure. FIG. 3 shows one example of an overall view of a menu map 30. At the initial scale, the menu map of FIG. 3 is displayed fully on the entire screen of the image display device 12. The menu map data stored in the data storage section 18 shows the menu map 30.

In the menu map data, multiple partial areas are allocated not to overlie on each other on the virtual plane. Each of the partial areas corresponds to each of the menu items. More specifically, each of the menu items of the menu map data has one record. Each record includes a set of hierarchy data (i), area range data (ii), display image data (iii), and function type data (iv).

The hierarchy data (i) shows a hierarchy to which a corresponding menu item belongs. The hierarchy of a menu item shows how many classifications are before a classification to which the menu item belongs. The uppermost classification, namely the broadest classification, includes the navigation control, audio-visual control, and air conditioning. The menu items of the second classification include, for example, a function setting, guide setting, and destination setting subordinate to the navigation control. In the function setting, parameters are determined for detailed operations of the navigation control. In the guide setting, parameters are determined for detailed operations of the route guide process. For example, as items subordinate to the destination setting, the third classification includes a setting by the Japanese syllabary, setting by addresses, setting by registered points, setting by phone numbers, setting by zip codes, and setting by home positions.

The area range data (ii) shows a range which is occupied in the virtual plane by a partial area allocated to a corresponding menu item. In this embodiment, the menu items are located concentrically around an origin 31 in the virtual plane. The menu items of the same hierarchy are located circularly on the same layer. The nearer layer to the origin 31 includes menu items of the higher hierarchy.

In the example of FIG. 3, a circular area surrounded by circles 32, 33 around the origin is the first layer corresponding to the uppermost hierarchy. In this first layer, each of three areas is located within an angle range of 120 degrees around the origin. The three areas are occupied by the items of the navigation control, audio-visual control, and air conditioning, respectively. A circular area just outside the circle 33 is a second layer corresponding to the second hierarchy. In this second layer, multiple areas within multiple angle ranges around the origin 31 are occupied by the menu items of the second hierarchy. A circular area just outside the second layer is a third layer corresponding to the third hierarchy. In the third layer, multiple areas within multiple angle ranges about the origin 31 are occupied by the menu items of the third hierarchy.

An area of each menu item is located further from the origin 31 than an area of a menu item to which the each lower menu item is subordinate. An area of each menu item is located nearer from the origin 31 than an area of a menu item subordinate to the upper menu item.

An angle range of a partial area of a lower menu item is within an angle range of an upper menu item above the lower menu item. For example, the angle range of the menu item of the navigation function includes the angle ranges of the function setting, destination setting, and guide setting subordinate to the navigation function.

As described above, in this menu map, the menu items are located in the form of the tree structure radiating from the origin 31.

The display image data (iii) is image data used for displaying a corresponding menu item. In the example of FIG. 3, an image showing the menu item of the navigation control includes a border of the area of the menu item, a color inside the border, and an image of a character string "NAVI" inside the border. Each of the images showing menu items of lower hierarchies such as the second and third hierarchies includes a border of the area of the menu item, a color inside the border, and an image of a character string or figure inside the border. For simple explanation, in FIG. 3, display images of menu items of the third hierarchy and subsequent hierarchies are made simple or omitted. Colors of the partial areas may be different from each other or the same as each other. As explained later, the display image data may change in accordance with a change of data stored in the data storage section 18 and operations to the operating section 13 by the user.

The function type data (iv) shows a function of a corresponding menu item. In this embodiment, only menu items of the lowest hierarchy (end) of the tree structure, namely only menu items having no subordinate menu item, correspond to the functions. The function type data is explained later in detail.

By a process of Step S105, images of the menu items in the virtual plane are displayed on the display screen of the image display device 12. The images are arranged similarly to the arrangement among the menu items. In Step S105, the control circuit 19 displays a pointer 30 such as a crosshair cursor on a position corresponding to the origin 31 of the menu map 30 so that the pointer 30 overlies on the menu map 30. As described later, the pointer 30 can move on the display screen in response to an operation of the operating section 13 by the user (corresponding to one example of pointing in a first method).

In Step S110 after Step S105, the control circuit 19 determines whether content of the menu map data needs to be changed. When the content needs to be changed, the content is changed. The case where the change is needed is explained later in detail.

In Step S120, in accordance with a signal from the operating section 13, the control circuit 19 calculates a moving direction and moving amount of the pointer 35. Then, in accordance with the calculated moving amount, a new position (corresponding to one example of a pointed portion) of the pointer 35 is determined on the virtual plane. The moving direction of the pointer 35 is determined in accordance with a tilt amount of the stick type input device 13a, a moving direction of an object on a contact surface of the touch pad 13b, and a type of a button switch operated in the mechanical switch 13d. The moving amount of the pointer 35 is specified in accordance with a tilt angle of the knob of the stick type input device 13a and a moving amount of the object on the contact surface of the touch pad 13b, and the frequency and duration of the operations to the mechanical switch 13d. The position of the pointer 35 may be specified as a position corresponding to a position where the touch panel 13c is touched. Alternatively, when one of the menu items is specified by speech of the user, the position of the pointer 35 may be specified as a position belonging to a display range of an image showing the specified menu item. In Step S120, when the operating section 13 is operated so that the pointer 35 is returned to a home position, a new position of the pointer 35 is moved to the origin 31.

In Step S130, in accordance with a position of the pointer 35 on the virtual plane, an enlargement scale for the initial scale of the menu map is determined. In Step S140, one area to be focused is determined in accordance with a position of the pointer 35 on the virtual plane. In Step S150, in accordance with the focused area, a background image is determined.

In Step S155, the menu map 30 is displayed again in accordance with the results of Steps S110 to S150. In other words, the control circuit 19 displays the menu map 30, which is kept up-to-date, fully on the display screen of the image display device 12, and around the position of the pointer 35, at the enlargement scale for the initial scale. The position of the pointer 35 is determined in Step S120. The enlargement scale is determined in Step S130. The pointer 35 is displayed on the position determined in Step S120 (namely, the center of the display). The area to be focused determined in Step S140 is highlighted. The background image determined in Step S150 is overlaid on the menu map 30 transparently.

In Step S140, when the pointer 35 is positioned on the areas having subordinate menu items such as the menu items of the first and second hierarchies, the control circuit 19 determines that no area is to be focused. In Step S150, the control circuit 19 determines that no background image is needed for some menu items where the pointer 35 is positioned.

For example, when a position of the pointer 35 is specified using the touch panel 13c, the user can touch a position shifted from a display area of an image of a target menu item and extending over the areas of multiple images. In such a case, it cannot be specified, from the position touched by the user, which menu item the user wants to select. However, it can be guessed that the user wants to select at least one of the items in the areas over which the touched position extends. An enlargement scale of the images may be determined in Step S130 so that, when the touched position extends over display areas of multiple images, the multiple images may be highlighted. As a result, the user selects a target image again easily. Even when a position of the pointer 35 extends over display ranges of images showing multiple menu items by use of an operating device other than the touch panel 13c, the same display control process as the above one is preferably executed.

Figure 4:
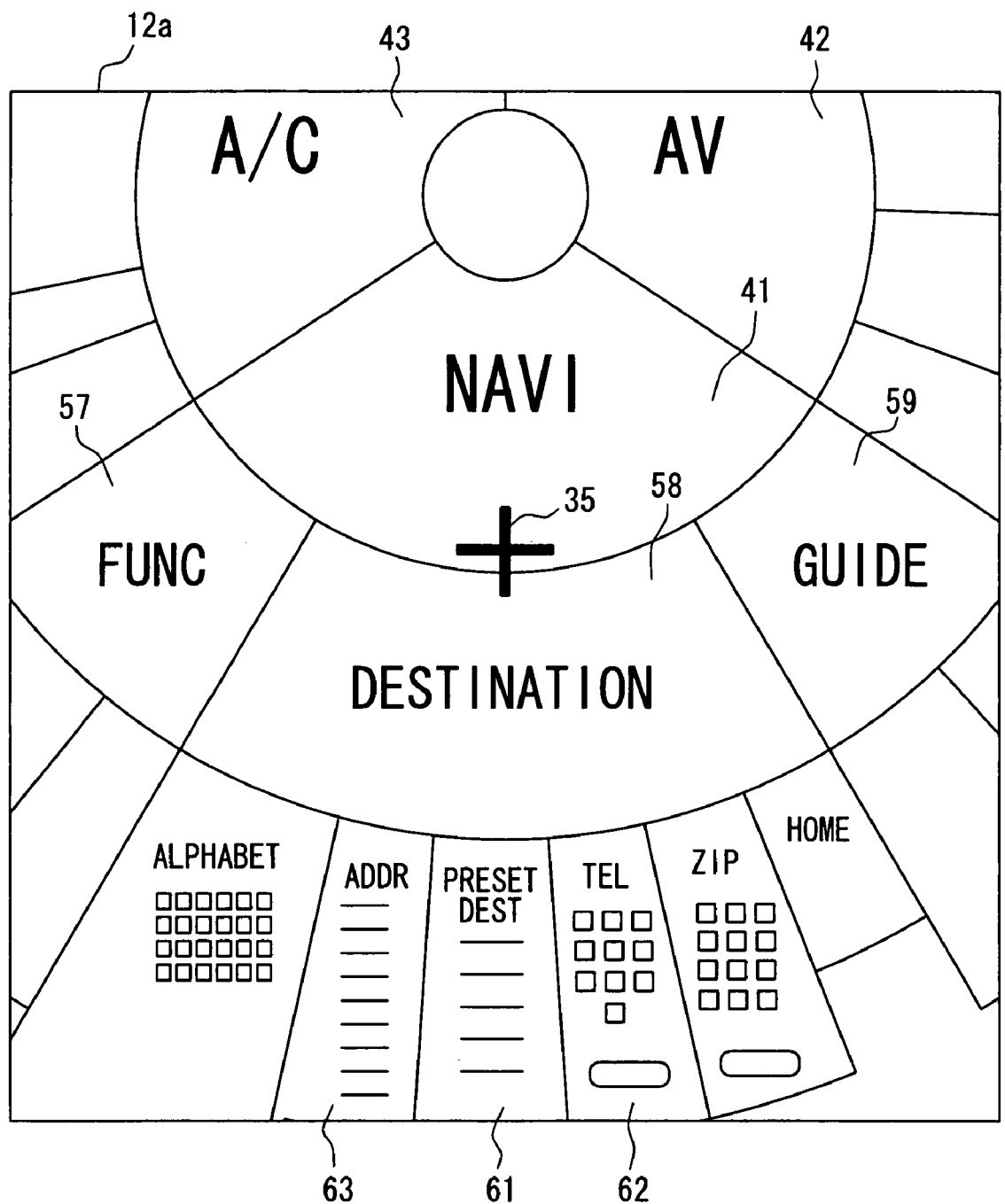
FIG. 4 shows a state where a first hierarchy or below of the menu map 30 are enlarged, and displayed on a display screen of an image display device 12.

In FIGS. 4 to 8, 10 to 15, the menu map 30 displayed again in the display screen of the image display device 12 is exampled. In the example of FIG. 4, the pointer 35 is positioned on a menu item 41 of the navigation control. At this time, an enlargement scale (hereinafter called a secondary enlargement scale) of the menu map 30 is the maximum enlargement scale at which the menu item 41 of the navigation control and all subordinate menu items of the menu item 41 can be seen. As a result of such a display control, part of menu items 42, 43 of the same hierarchy as the menu item 41 is displayed on an edge of the display screen.

Figure 5:
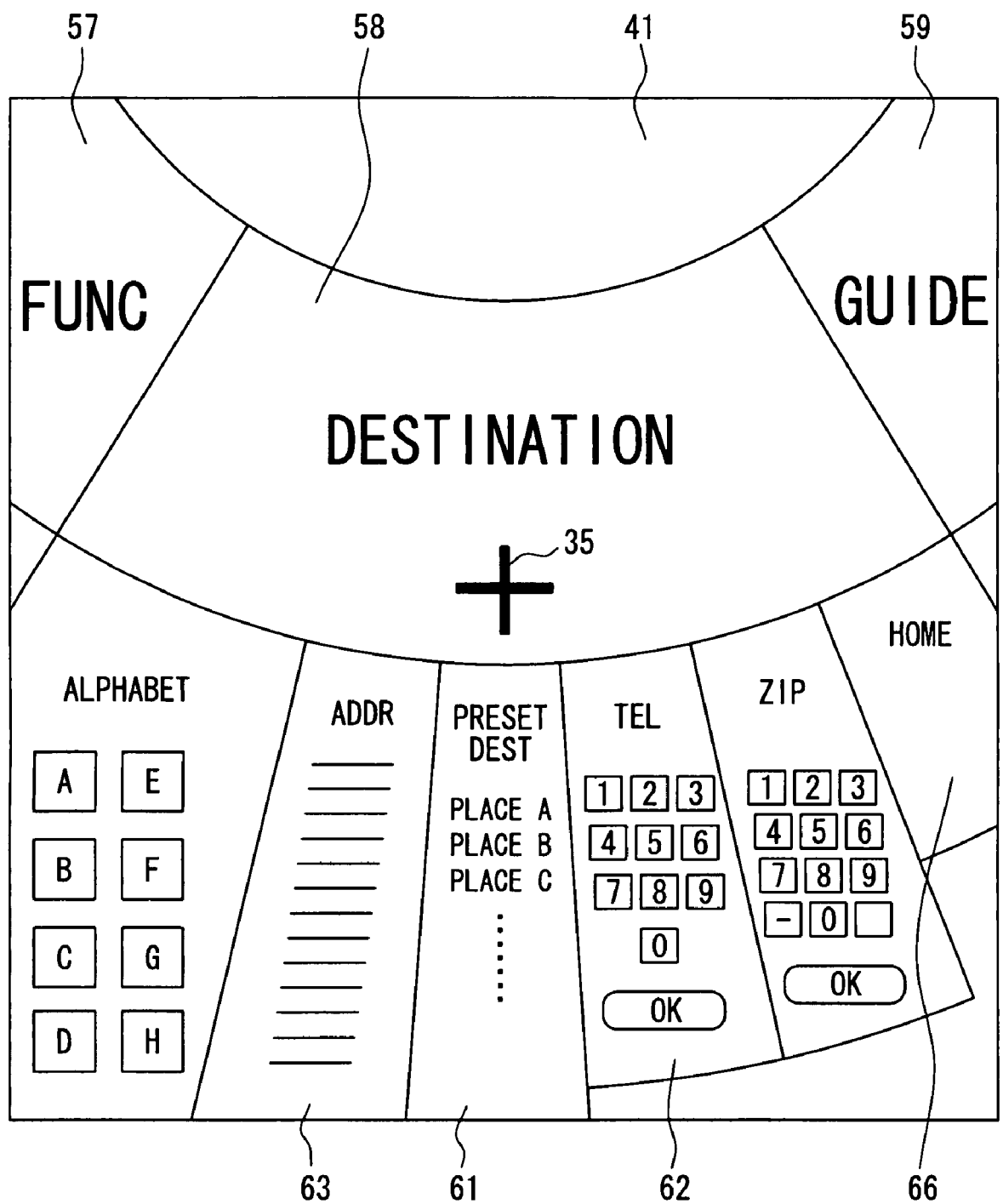
FIG. 5 shows a state where a second hierarchy or below of the menu map 30 are enlarged, and displayed on the display screen.

In the example of FIG. 5, the pointer 35 is positioned on an image of a menu item 58 of the destination setting subordinate to the menu item 41 of the navigation control. At this time, an enlargement scale of the menu map 30 (hereinafter called a third enlargement scale) is the maximum enlargement scale at which the menu item 58 of the destination setting and all subordinate menu items of the menu item 58 can be seen. As a result of such a display control, part of menu items 57, 59 of the same hierarchy as the menu item 58 is displayed on an edge of the display screen.

Figure 6:
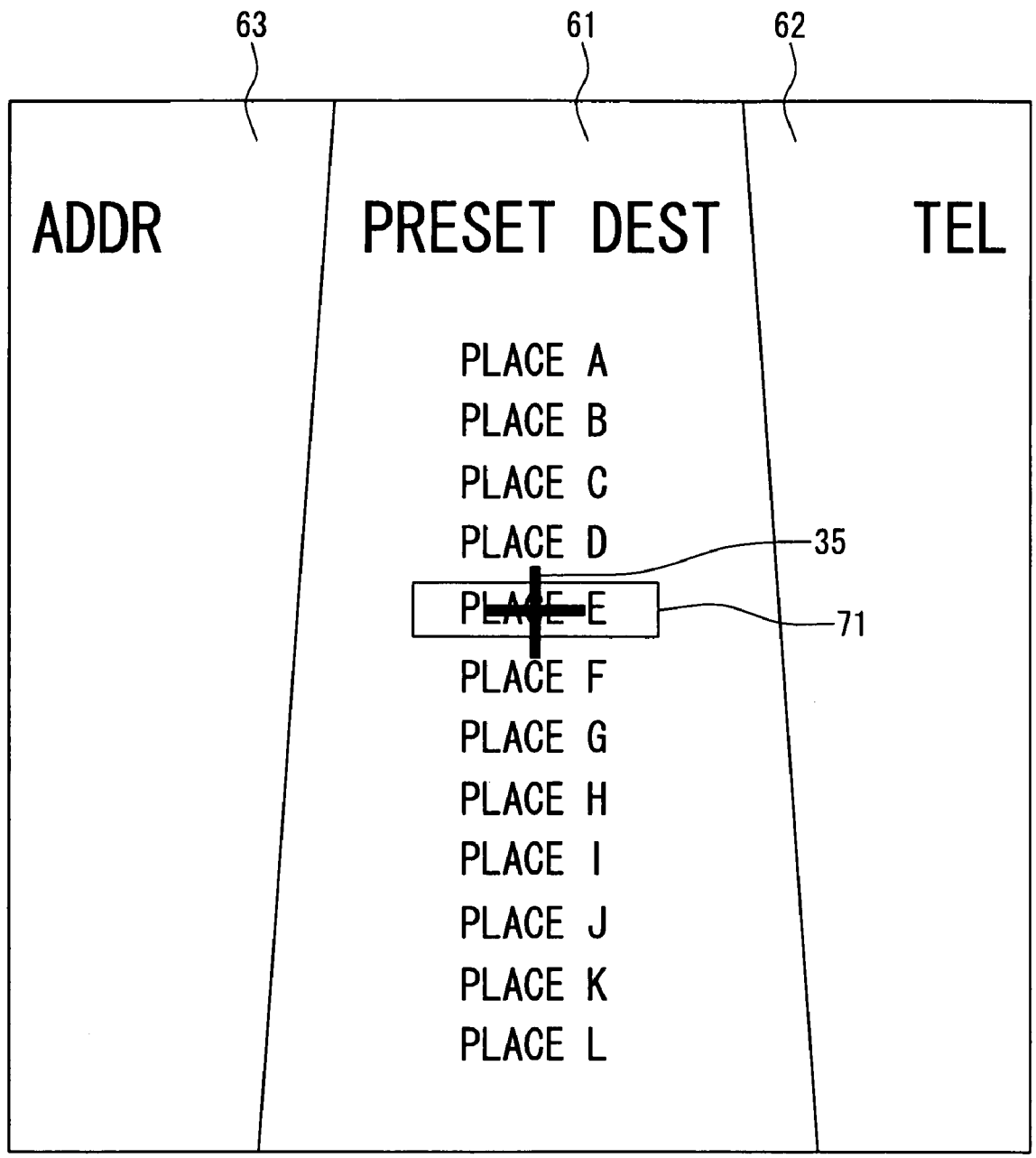
FIG. 6 shows a state where a third hierarchy of the menu map 30 is enlarged, and displayed on the display screen.

In the example of FIG. 6, the pointer 35 is positioned on an image of a menu item 61 of the registered point selection which is subordinate to the menu item 58 of the destination setting. At this time, an enlargement scale of the menu map 30 (hereinafter called a forth enlargement scale) is the maximum enlargement scale at which almost all content of the menu item 61 of the registered point selection can be seen. As a result of such a display control, part of menu items 62, 63 of the same hierarchy as the menu item 61 is displayed on an edge of the display screen.

The enlargement scale of the menu map 30 becomes higher in the order: the secondary enlargement scale, third enlargement scale, and forth enlargement scale, as the pointer 35 separates from the origin 31 in the order: the first hierarchy, secondary hierarchy, and third hierarchy.

The menu item 61 has no subordinate hierarchy. The menu item 61 has areas to be focused. The areas correspond to specific functions. The control circuit 19 uses positional information about the pointer 35 and the menu map data to determine an area to be focused in Step S140. More specifically, the control circuit 19 extracts a record having area data including a position of the pointer 35 in the virtual plane from the menu map data, and reads function type data in the record.

The function type data has data showing a program module for achieving a function corresponding to a target menu item. The function type data has data showing correspondence (for example, one-to-one) between one or more areas (hereinafter called a selection area) in the area of the target menu item and one or more arguments passed to the program module. For example, an image of the menu item 61 of registered point selection includes characters "registered points" showing the function of the menu item 61 and a list of selectable registered points. The function type data of the menu item 61 is a program module for receiving setting point data (for example, latitude, longitude) as arguments, and setting the data as a destination. In the function type data of the menu item 61, character strings of registered points in the registered point list are selection areas, and each selection area is associated with point data of the point shown by each character string.

The control circuit 19 uses the selection areas as candidates to be focused. In the candidates, the nearest area to the pointer 35 is determined as a target to be focused. For example, in FIG. 6, since the pointer 35 is positioned in a selection area 71 having Place E as an argument, the selection area 71 is focused.

Figure 7:
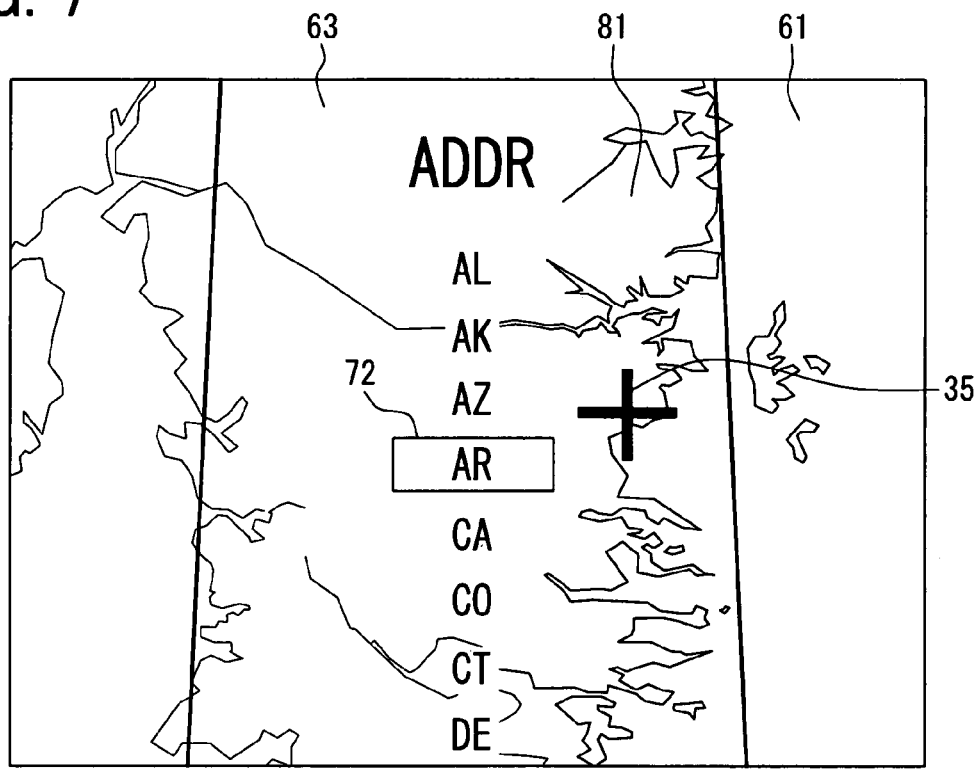
FIG. 7 shows a state where a background image including a map of a focused prefecture name is displayed on the display screen.

In the example of FIG. 7, the pointer 35 is positioned on an image of a menu item 63 of the address selection which is subordinate to the menu item 58 of the destination setting. The menu item 63 is enlarged on the image display device 12 at the forth enlargement scale. Since the pointer 35 is positioned nearest to a selection area 72 having an argument of AR in multiple selection areas (such as AL and AZ) in the menu item of the address selection, the selection area 72 is focused. In Step S150, when one of the selection areas in the menu item of the address selection is focused, the control circuit 19 determines a map corresponding to an argument of the selected area as a background image. In Step S155, the control circuit 19 produces this map in accordance with the map data in the data storage section 18, and displays this produced map on the menu map transparently.

Figure 8:
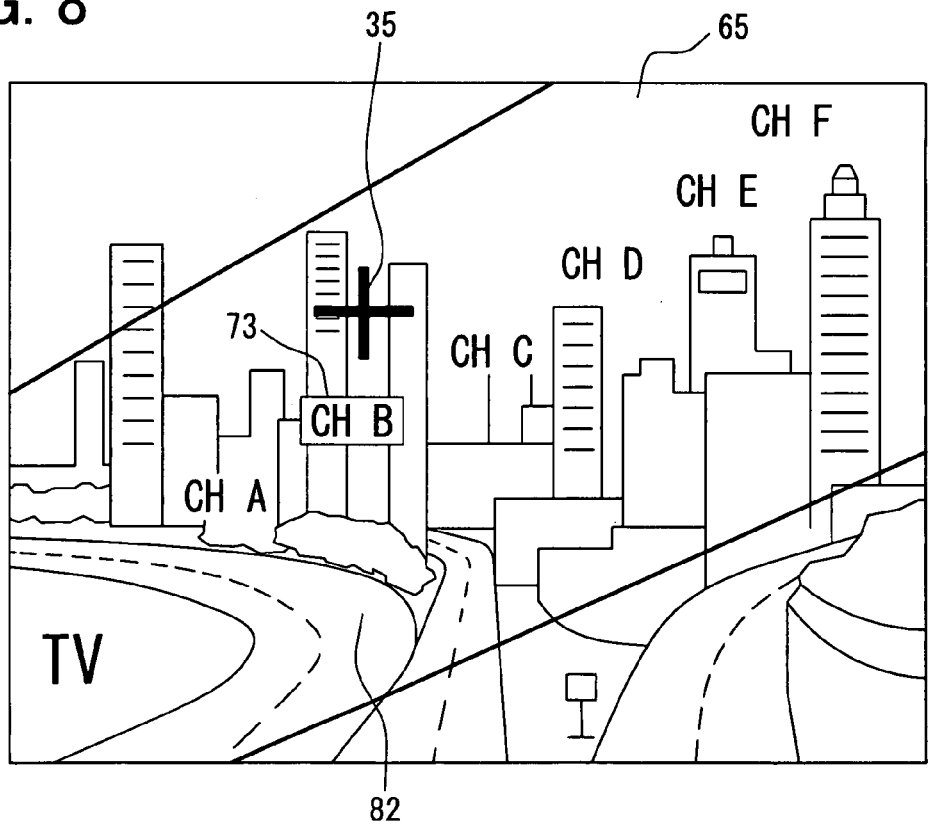
FIG. 8 shows a state where a background image including a broadcast video of a focused channel name is displayed on the display screen.

In the example of FIG. 8, the pointer 35 is positioned on an image of a menu item 65 of TV channel selection subordinate to the menu item 53 (see FIG. 3) subordinate to the menu item 53 of the audio-visual selection. The menu item 65 is enlarged at the forth enlargement scale on the image display device 12. The pointer 35 is positioned nearest to a selection area 73 having an argument of a channel B in multiple selection areas (such as channel A and channel B) of the menu item of the TV channel selection. Accordingly, the selection area 73 is focused. In Step S150, when one of the selection areas in the menu item of the TV channel selection is focused, the control circuit 19 determines a moving picture broadcasted at a channel corresponding to an argument of the focused selection area, as a background image. In Step S155, the control circuit 19 produces a moving picture or still image of the channel in accordance with a video signal of the channel, the video signal being obtained from the tuner 10. Then, the control circuit 19 allows the produced moving picture or still image to be overlaid on the menu map transparently.

An image semantically relating to the selection area focused in the menu item in accordance with a position of the pointer 35 is displayed as a background of the menu map 30, so that the user can understand which selection area is focused clearly.

The selection areas to be focused are not always part of the lowest hierarchy. For example, the whole area of a menu item 66 (see FIG. 5) of the home selection is one selection area.

In Step S155 after Step S160, the control circuit 19 determines whether the focused selection area is operated to determine the selection (corresponding to one example of pointing in a second method) in accordance with a signal from the operating section 13. To determine the selection, the touch pad 13b is tapped (touched in short time), the touch panel 13c is tapped, and a predetermined determination button of the mechanical switch 13d is pushed. When the control circuit 19 determines the selection is determined, the control circuit 19 executes Step S170. When the control circuit 19 determines the selection is not determined, the control circuit 19 executes Step S110 again.

In Step S170, a process is executed in accordance with the operation for deciding the selection, the operation being detected in Step S160. In other words, the process for achieving the function of the menu item which is determined to be selected is executed. The menu item determined to be selected is a menu item including the selection area focused at the time of the operation for the selection determination. More specifically, in response to the determination of the selection, an argument relating to the selection area focused at the time of the determination is passed in accordance with the function type data to execute a program module of the menu item determined to be selected.

For example, in case of the determination of selection when the selection area 71 of Place E in the menu item 61 of the registered point selection is focused, the control circuit 19 passes an argument of Place E to a program module of the menu item 61, and executes the program module. Then, the control circuit 19 sets a location of Place E as a destination.

For example, when the menu item 66 of the home selection is determined to be selected, the control circuit 19 executes a program module of the menu item 66 to set a home as a destination.

Figure 9:
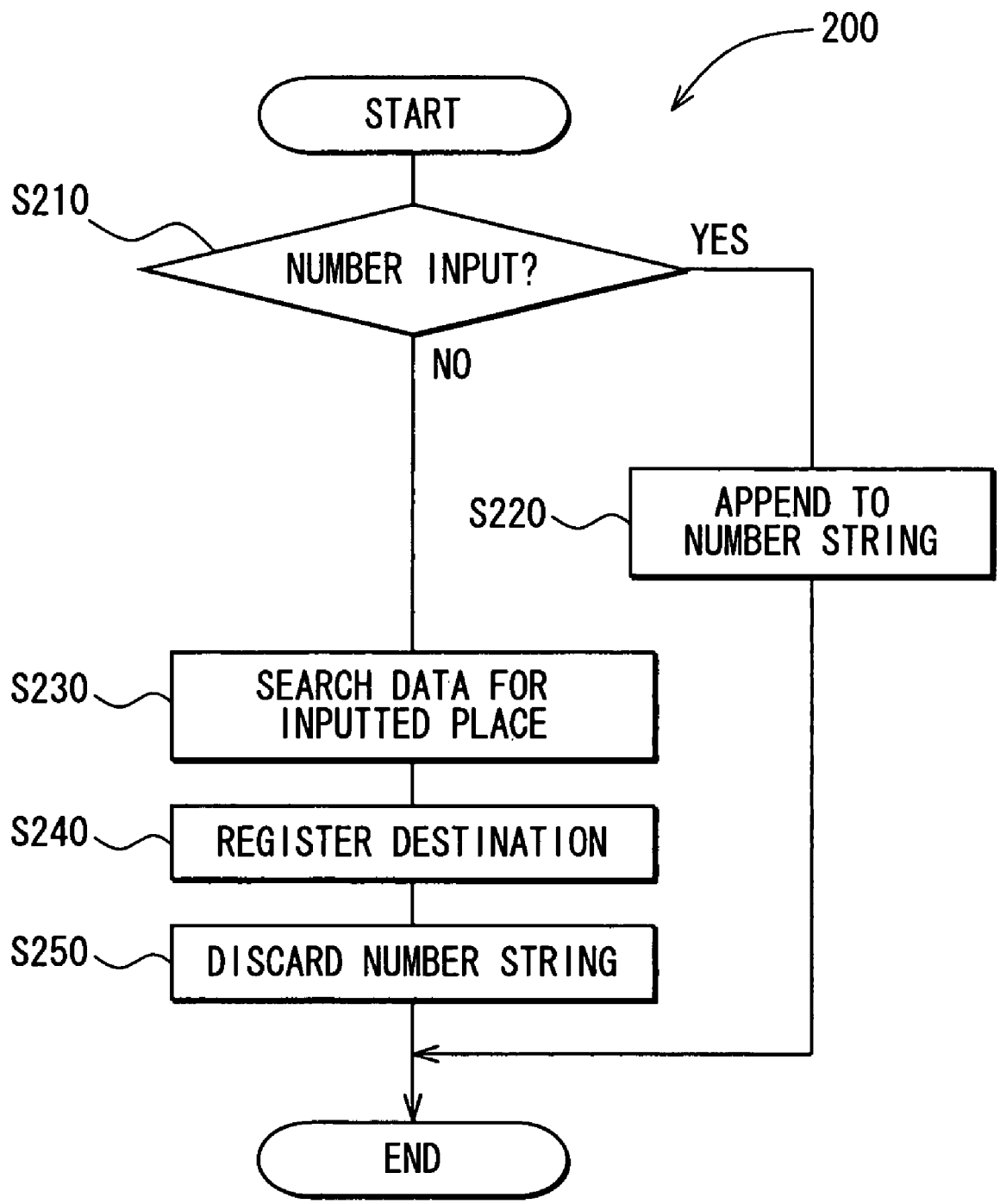
FIG. 9 shows a flowchart of a phone number input program 200 executed by the control circuit 19.

For example, in case of the determination of selection when one of the selection areas in the menu item 62 of the phone number selection is focused, the control circuit 19 passes an argument of the selected selection area to a program module of the menu item 62, and executes the program module. FIG. 9 shows a flowchart of a phone number input program 200, which is a program module corresponding to the menu item 62 of the phone number selection.

Figure 10:
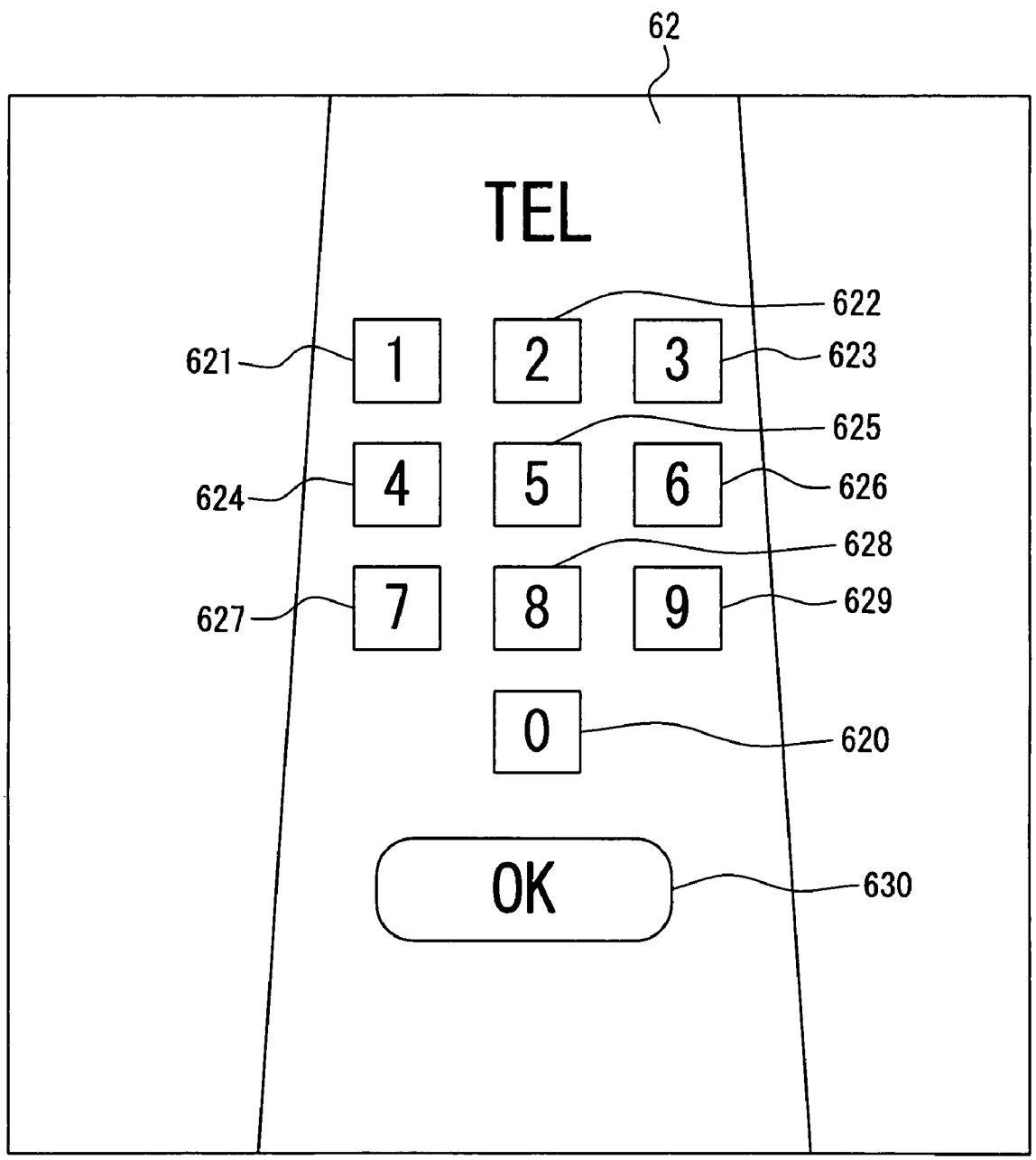
FIG. 10 shows a state where a menu item 62 for selecting a phone number in the menu map 30 is enlarged on the display screen.
Figure 11:
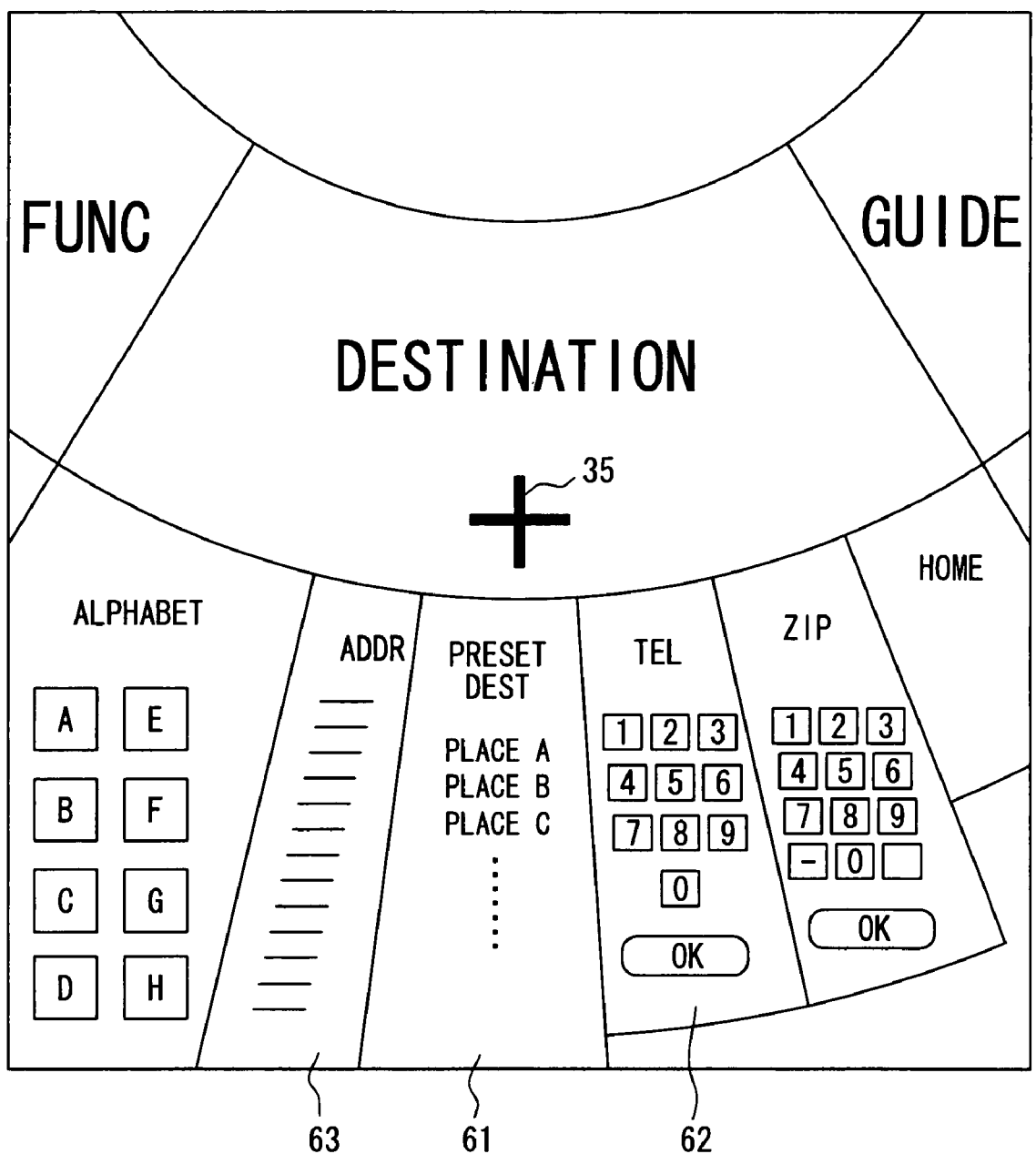
FIG. 11 shows a state where a width of an area of a menu item 61 for a registered point selection is spread.
Figure 12:
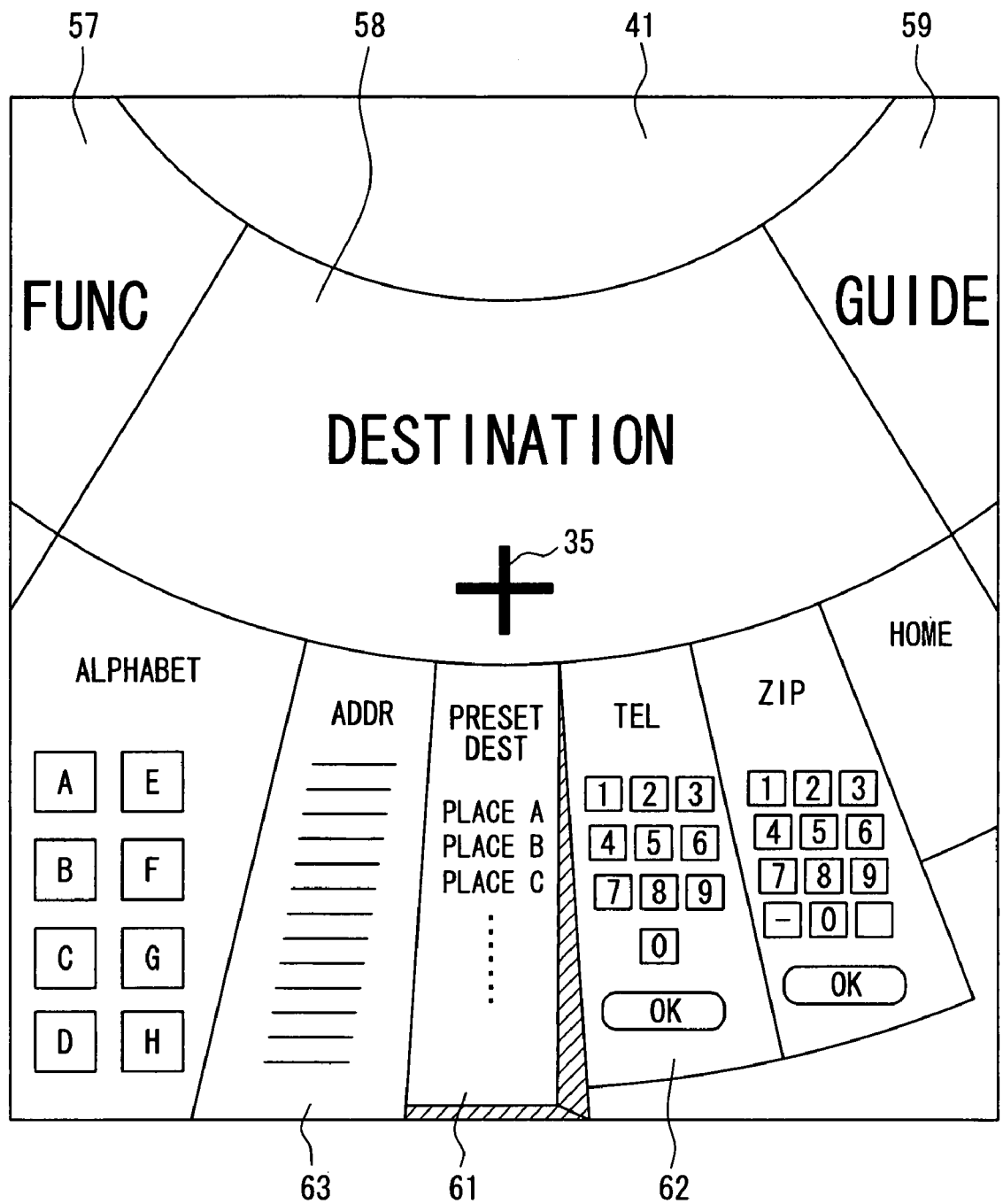
FIG. 12 shows a state where the area of the menu item 61 for a registered point selection is displayed stereoscopically.
Figure 13:
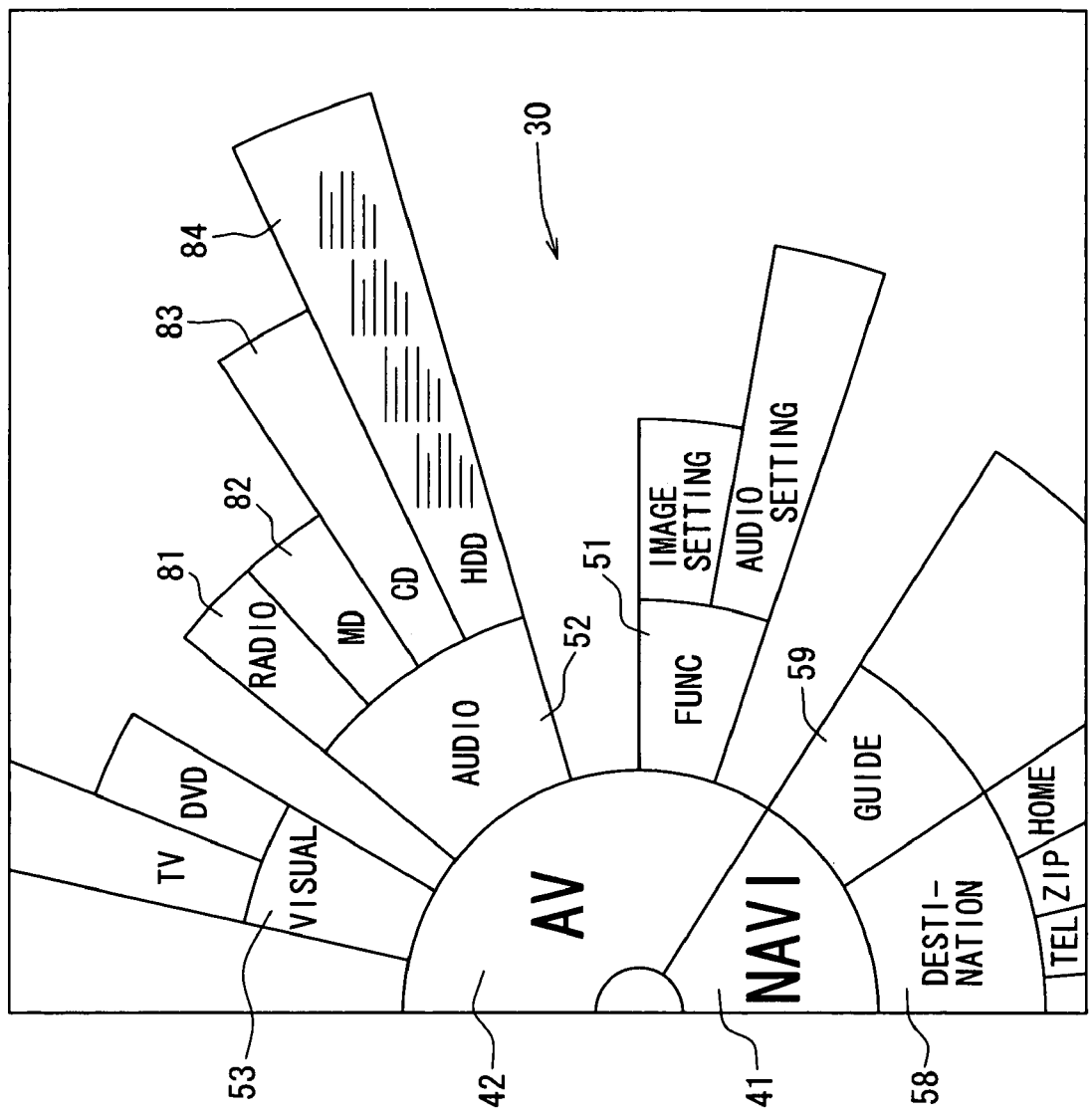
FIG. 13 shows part of the menu map 30.

In Step S210, in the execution of the phone number input program 200, the control circuit 19 determines whether the passed argument is a number. As shown in FIG. 10, the menu item 62 of the phone number selection has eleven selection areas 620 to 630. The selection areas 620 to 629 are associated with arguments 0 to 9, respectively. The selection area 630 is associated with data showing that an argument is determined. Therefore, in Step S210, it is determined whether one of the selection areas 620 to 629 is selected. When the determination is affirmative, Step S220 is executed. When the determination is negative, namely when the passed argument is the data showing the determination, Step S230 is executed.

In Step S220, a number passed as an argument is added to an end of a number string stored in the RAM 16 or data storage section 18 as a variable for a predetermined number string. When there is no variable, a number passed as an argument is stored as a top number of the variable for the number string. After Step S220, one execution of the phone number input program 200 is completed.

In Step S230, as a process after the number string is completed, a position of a facility corresponding to a number string in the variable for the number string is searched in accordance with the facility data in the data storage section 18. In Step S240, the searched position is registered as a destination in the RAM 16 as a variable for the destination. In Step S250, the content of the variable for the number string is made empty, and after that, one execution of the phone number input program 200 is completed.

By executing the phone number input program 200, each time the user executes a selecting operation for inputting a number (see Step S210), the control circuit 19 adds a number inputted by the operation to a number string in a storage medium (see Step S220). When the control circuit 19 detects a completion of the number string (see Step S210), the control circuit 19 sets a point corresponding to a phone number made of the number string as a destination (see Steps S230, S240), and after that, deletes the number string in the storage medium (see Step S250). Even when the control circuit 19 executes a function corresponding to a different menu item before the number string is completed, the number string in process of production remains stored in the storage medium. Accordingly, the production of the number string can be restarted in the middle of the production by focusing the selection area of the menu item 62 of the phone number and determining the selection of the focused selection area after the process of the different menu item is completed.

When the menu program 100 is completed, namely when the display of the menu map 30 is completed, the number string may be deleted from the storage medium. In such a structure, content of an unnecessary old setting can be deleted automatically.

In Step S180, after the execution of the program module of the menu item determined to be selected is completed, the control circuit 19 updates a usage history of the function executed in Step S170 in the data storage section 18. More specifically, the number of usages of a variable area corresponding to the function is incremented by one in a HDD of the data storage section 18. Alternatively, a date of the usage in this time may be added to the variable area corresponding to the function in the HDD of the data storage section 18. By such a process, each time a function corresponding to each menu item of the menu map 30 is executed, data of the number of the usages of the function is incremented by one. After Step S180, Step S110 is executed again.

It is determined whether content of the menu map data needs to be changed in Step S110 in accordance with a change of the data of the number of usages of each function and a change of the functions achieved by the control circuit 19.

(i) For example, as the number of usages or usage frequency of each function increases, the control circuit 19 highlights a display of a menu item corresponding to the function in accordance with the data of the number of usages of each function. For example, each time the number of usages of a function is incremented predetermined times, an image of a menu item corresponding to the function is highlighted. To highlight the image, as shown by the menu item 61 in FIG. 11, as the number of usages or usage frequency increases, the angle range of the menu item 61 around the origin 31 may increase. In this case, a direction from the origin 31 to the center of the area may be fixed. As shown by the menu item 61 in FIG. 12, as the number of usages or usage frequency increases, the image of the menu item 61 may be changed to a higher stereoscopic display. As the number of usages or usage frequency increases, one of or a combination of two or more of brightness, colorfulness, and concentration of the image of the menu item may be increased.

To display each of the images of the menu items, the control circuit 19 highlights the image as the frequency of executions of the function increases, in accordance with the usage history of the function corresponding to the image, the history being recorded in the storage medium. Accordingly, the image corresponding to the function having the higher usage frequency used is highlighted more intensively. As the user continues using the menu map 30, the user can easily find a menu item corresponding to a user's favorite function.

Some of the functions corresponding to the images can be executed more easily and quickly in response to speech of the user. The others can be executed conveniently in response to an operation by the hand of the user. The function having the high usage frequency can vary between in case of an operation by the hand of the user and in case of an operation by speech of the user.

A history of functions achieved by the hand of the user and a history of functions achieved by speech are recorded separately. When the user executes a pointing operation, the multiple images are preferably displayed such that the images corresponding to the functions having the high usage frequencies are highlighted in accordance with the history of the operating device to be used (speech recognition device or other operating devices).

When the user starts using a speech recognition device, a talk switch (not shown) is turned on. Unless the talk switch is turned on, the images corresponding to the functions having the high usage frequencies are highlighted in accordance with the history of the functions achieved using the hand of the user. When the talk switch is turned on, the images corresponding to the functions having the high usage frequencies are displayed in accordance with the history of the function achieved using speech of the user. Accordingly, in accordance with the history of the operating device used for an instruction by the user, the image corresponding to the function having the high usage frequency can be highlighted.

The history of the functions achieved by the instruction by the hand of the user and the history of the functions achieved by the instruction by speech are stored separately. In accordance with the separately stored histories, the images corresponding to the functions achieved by the instruction by the hand of the user and having high usage frequencies and images corresponding to the functions achieved by the instruction by speech of the user and having high usage frequencies may be highlighted differently on the display screen of the menu map 30. In this case, whether the user uses either of the operating devices, the images corresponding to the functions instructed by the hand and having high usage frequencies and the images corresponding to the functions instructed by speech and having high usage frequencies can be distinguished from each other, and highlighted on the menu map 30. For example, to achieve the above distinction, an image of a microphone can be added to an image corresponding to the function which is operated by speech and has a high usage frequency.

The above usage histories of the achieved functions may be recorded separately in accordance with whether the vehicle is running, as well as whether the instruction is done by the hand or speech. This is because the user uses a different function between when the vehicle is running and when the vehicle is parked.

(ii) For example, the control circuit 19 detects that a new device is connected to the interface 15 in accordance with acquisition of identification information about the device from the interface 15. Then, the control circuit 19 adds a record of a menu item corresponding to a function such as a control of the device, to the map data. The newly added record may be stored in the data storage section 18 in advance in association with the identification information about the device, and may be received from the device via the interface 15.

As the new device, a mobile music player is exampled. As shown by a change from FIG. 13 to FIG. 14, when the mobile music player is connected, the control circuit 19 adds a menu item 85 for controlling the mobile music player to an empty space in the menu map 30, namely an area not occupied by other menu items in the menu map 30. The hierarchy data of a record added to the map data at this time is the third hierarchy subordinate to the menu item of the audio control subordinate to the menu item of the audio-visual control. The area range data of this record is the empty space in the menu map 30.

The display image data of this record is a character string image showing "outer memory" and a music list stored in the mobile music player. The music list is acquired from the mobile music player via the interface 15.

The function type data of this record includes data specifying a program module which outputs a control signal for allowing the mobile music player to play music to the mobile music player via the interface 15. Instead of this program module, the function type data may include a program module in which the control circuit 19 plays music contained in the mobile music player, and outputs the music to the speaker 14. The function type data includes data showing a one-to-one relationship between the multiple selection areas and pieces of music in the music list. The selection areas are positioned to portions of the corresponding pieces of music in the display image data. The menu map 30 has an empty space in its initial state.

Figure 14:
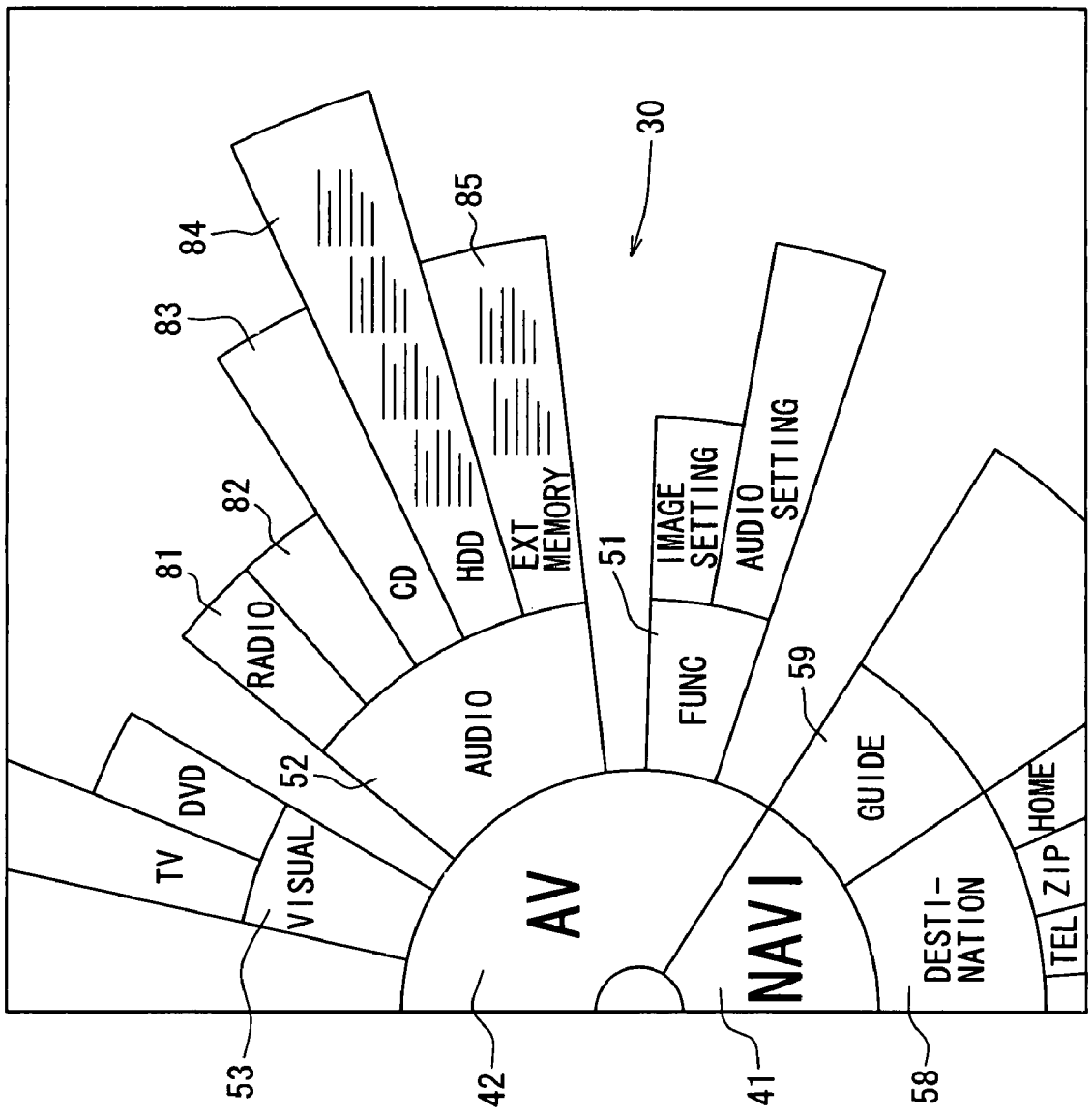
FIG. 14 shows a state where a menu item 85 is added to the menu map 30.
Figure 15:
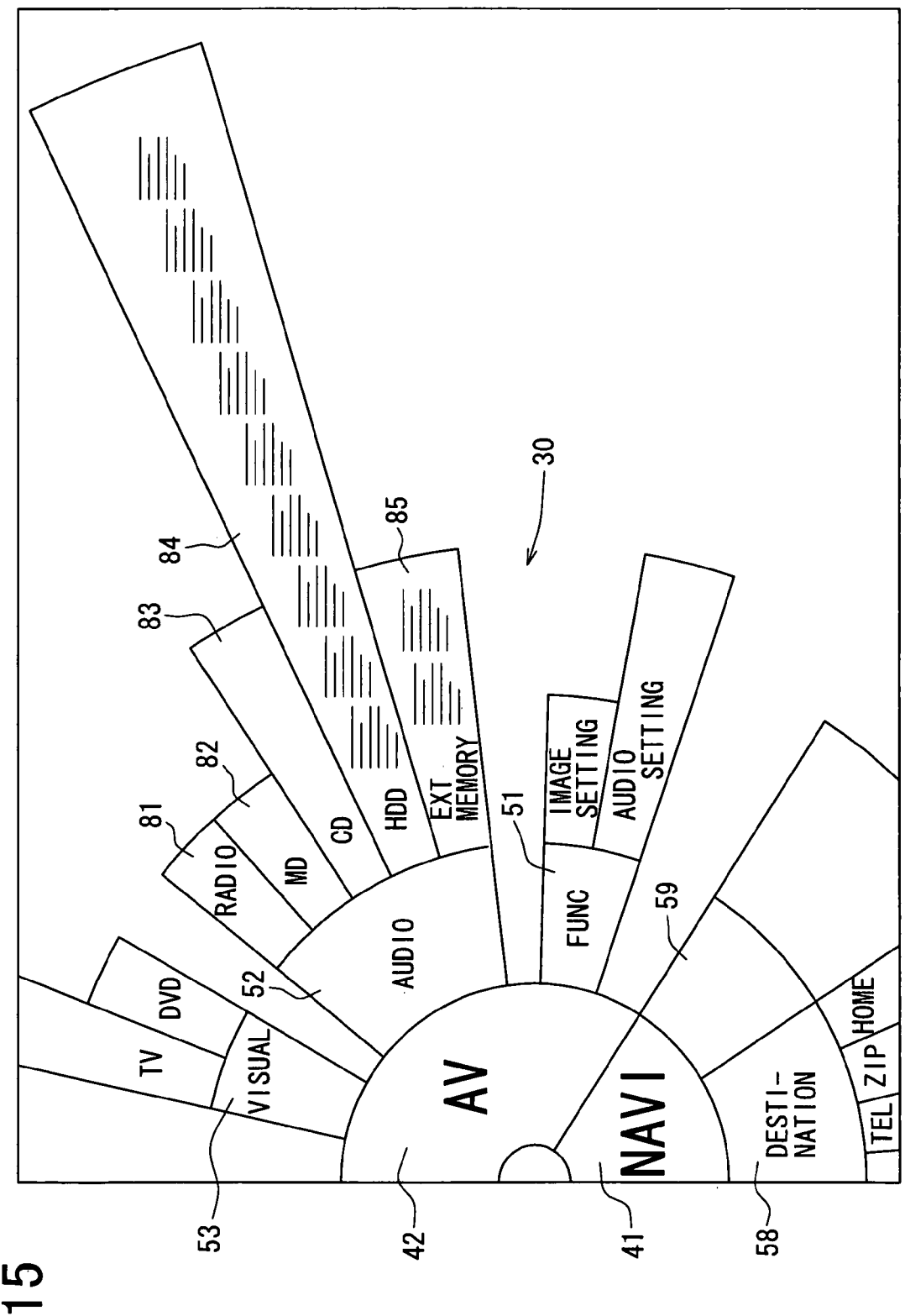
FIG. 15 shows a state where a menu item 84 extends on the menu map 30 of FIG. 14.

(iii) For example, when new data is added to the hard disk drive of the data storage section 18, the control circuit 19 changes a record of a menu item corresponding to a function using the added data in the menu map data. When the menu map data shows the menu map 30 as shown in FIG. 14, the control circuit 19 adds new music data acquired from the interface 15 to the data storage section 18. In this case, the control circuit 19 rewrites a record of a menu item 84 for playing music. In other words, area range data of the record is extended in the direction away from the origin 31. A list of the added pieces of music is added to the display image data. Data showing a one-to-one relationship between multiple selection areas and the list of the added pieces of music is added to the function type data. The added selection areas are positioned to portions of the corresponding pieces of music in the display image data. FIG. 15 shows the menu map 30 in which the menu item 84 is extended by changing the menu map data.

Due to the extremely extended area of the menu item, the whole of the menu map 30 sometimes cannot be displayed in the initial menu map display in Step S105 of the menu program 100. In this case, the initial scale may be changed so that the whole of the menu map 30 is fitted within the display screen, or may be fixed.

(iv) For example, the control circuit 19 adds a current position to the registered points when the user executes a predetermined operation by use of the operating section 13. At this time, the control circuit 19 changes the record of the menu item 61 of the registered point selection in the menu map data. More specifically, the control circuit 19 extends the area range data of the record in the direction away from the origin 31. The control circuit 19 adds a name of the added point to the display image data in accordance with the map data, and adds data showing a relationship between one selection area and the added point to the function type data.

(v) For example, the control circuit 19 adds a menu item for regulating setting items of new software to the empty space of the menu map 30 when the new software is installed in the data storage section 18. A record of the menu item added at this time may be acquired together with the software when the software is installed.

The control circuit 19 detects a new executable additional function, adds an image of an additional menu item corresponding to the detected additional function to the image of a different menu item, and displays the image of the additional menu item on the image display device. Then, the control circuit 19 achieves the additional function when the additional menu item is determined to be selected. Accordingly, when a new function is added, the control circuit 19 can display an additional menu item for receiving an operation by the user to achieve the new additional function.

As described above, the upper hierarchy menu items of the first and second hierarchies are displayed on the multiple areas in the first and second layers (corresponding to one example of the multiple upper areas) in the display screen of the image display device 12. The multiple menu items of the lowest hierarchy are displayed on the multiple area in the third layer (corresponding to one example of the multiple lower areas). In accordance with an operation to the operating section 13 by the user, a position (corresponding to one example of the pointed portion) of the pointer 35 in the display screen is specified. A menu item of the lowest hierarchy is determined in accordance with the specified pointed area. A function corresponding to the determined menu item is executed.

At this time, the multiple lower areas are respectively contained in the multiple lower angle ranges contained in each of the multiple upper angle ranges around the origin 31. The multiple upper areas are areas respectively contained in the multiple upper angle ranges. Each of the multiple upper areas is nearer to the origin than multiple subordinate lower areas of the multiple lower areas, the multiple subordinate lower areas being contained in the upper angle range corresponding to the each of the multiple upper areas. Each of the multiple upper images is an image that represents functions of lower areas subordinate to an upper area corresponding to the each of the multiple upper images.

In other words, the control circuit 19 displays multiple menu items of the upper menu hierarchy on the first circumference on the display screen of the image display device. The multiple lower menu items of the lower menu hierarchy subordinate to the upper menu hierarchy are displayed on the second circumference concentric with and larger than the first circumference. In accordance with an operation to the operating section 13 by the user, a pointed portion pointed in the display screen is specified. The function corresponding to one lower menu item determined by the specified pointed portion is executed. Each of the multiple lower menu items is positioned corresponding to a position of an upper menu item to which the each of the multiple lower menu items belongs, the upper menu item being in the multiple upper menu items.

In such control of the control circuit 19, the vehicular navigation device 1 displays the upper images around one point in the display screen. Additionally, the lower images corresponding to functions represented by each of the upper images are displayed in the substantially same direction from the origin as the upper image, and further from the origin than the upper image. Accordingly, when specifying a portion in the display screen to call a target function of the displayed lower image, the user can easily find a lower image for the target function by moving his/her eyes from the origin in the direction of the upper image representing the target function. The upper image functions as a guide to the lower image.

As the user learns the operation of the image display device, the user can acquire a sense about in which direction from the center of the screen and what function is displayed, such as the so-called locality. Accordingly, the user can find the lower image corresponding to the target function more easily.

Part of the menu map 30 is enlarged at an enlargement scale based on a specified position of the pointer 35, so that a menu item for the target function is easily found.

In this case, the enlargement scale becomes larger, as a distance between the pointer 35 and origin 31 becomes longer. Accordingly, since the lowest menu items are positioned further from the origin 31 than the corresponding upper menu item, the corresponding upper menu item tends to be more enlarged than the lowest menu items, which tend to be more complicated. Since multiple lowest menu items are contained within one angle range corresponding to each upper image, the lowest menu items tend to be displayed smaller. The lower images are more enlarged, so that the user can view the lower images more easily.

The position of the pointer 35 on the display screen corresponds to one example of a pointed portion pointed in the display screen in accordance with an operation to the operating device by the user. An image of a menu item to be focused corresponds to one example of one lower image determined in accordance with a specified pointed portion.

An image of a menu item of an uppermost hierarchy corresponds to one example of an upper image. A menu item of a second hierarchy corresponds to one example of a middle image. A menu item of a lowest hierarchy corresponds to one example of a lower image. Multiple areas of the first hierarchy correspond to examples of multiple upper areas. Multiple areas of the second hierarchy correspond to examples of multiple middle areas. Multiple areas of the third hierarchy correspond to examples of multiple lower areas. An angle range of an area of the upper hierarchy menu item, the angle range around the origin 31, corresponds to one example of an upper angle range. An angle range of an area of the menu item of the second hierarchy, the angle range extending from the origin 31, corresponds to one example of a middle angle range. An angle range of an area of the menu item of the lowest hierarchy, the angle range around the origin 31, corresponds to one example of a lower angle range.

Seen from another aspect, images of menu items of the uppermost and second hierarchies correspond to examples of the upper images. The image of the menu item of the lowest hierarchy corresponds to one example of the lower image. The multiple areas of the first and second layers correspond to examples of multiple upper areas. The multiple areas of the third layer correspond to examples of multiple lower areas. The angle ranges of the menu items of the upper hierarchy and second hierarchy, the angle ranges around the origin 31, correspond to one example of the upper angle range. The angle range of the menu item of the lowest hierarchy, the angle range around the origin 31, correspond to one example of the lower angle range.

Second Embodiment

Next, an image display control device of a second embodiment is explained. Since a structure of the image display control device of this second embodiment is the same as that of the first embodiment, the structure is not explained.

Figure 17A:
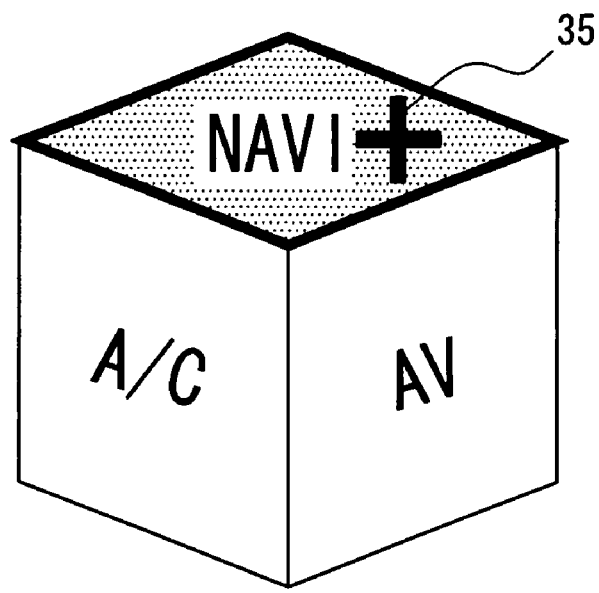
FIG. 17A shows a menu screen which is displayed initially by an image display control device of a second embodiment for menu processing and which includes only upper menu items.

FIG. 17A shows a menu screen shown by an image display device of this embodiment for a menu process. Unlike the first embodiment, this menu screen initially displays only images of upper menu items belonging to the first hierarchy. More specifically, an image of each upper menu item belonging to the first hierarchy is assigned to each surface of a dice-shaped cube, so that the upper menu items are displayed cubically.

In the example of FIG. 17A, the upper menu items are displayed only on three surfaces of the cube. Four or more upper menu items can be displayed by rotating the cube to display the hidden upper menu items on the back surfaces of the cube. The upper menu items hidden on the back surfaces of the cube may be displayed transparently.

Figure 17B:
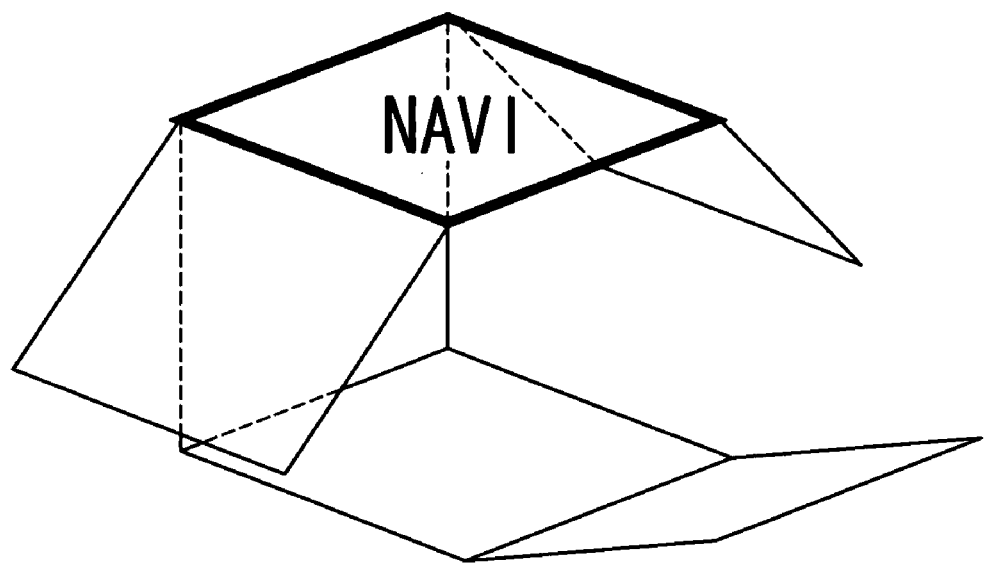
FIG. 17B shows an explanatory view for explaining a change of a display when one of the upper menu items is selected.
Figure 18:
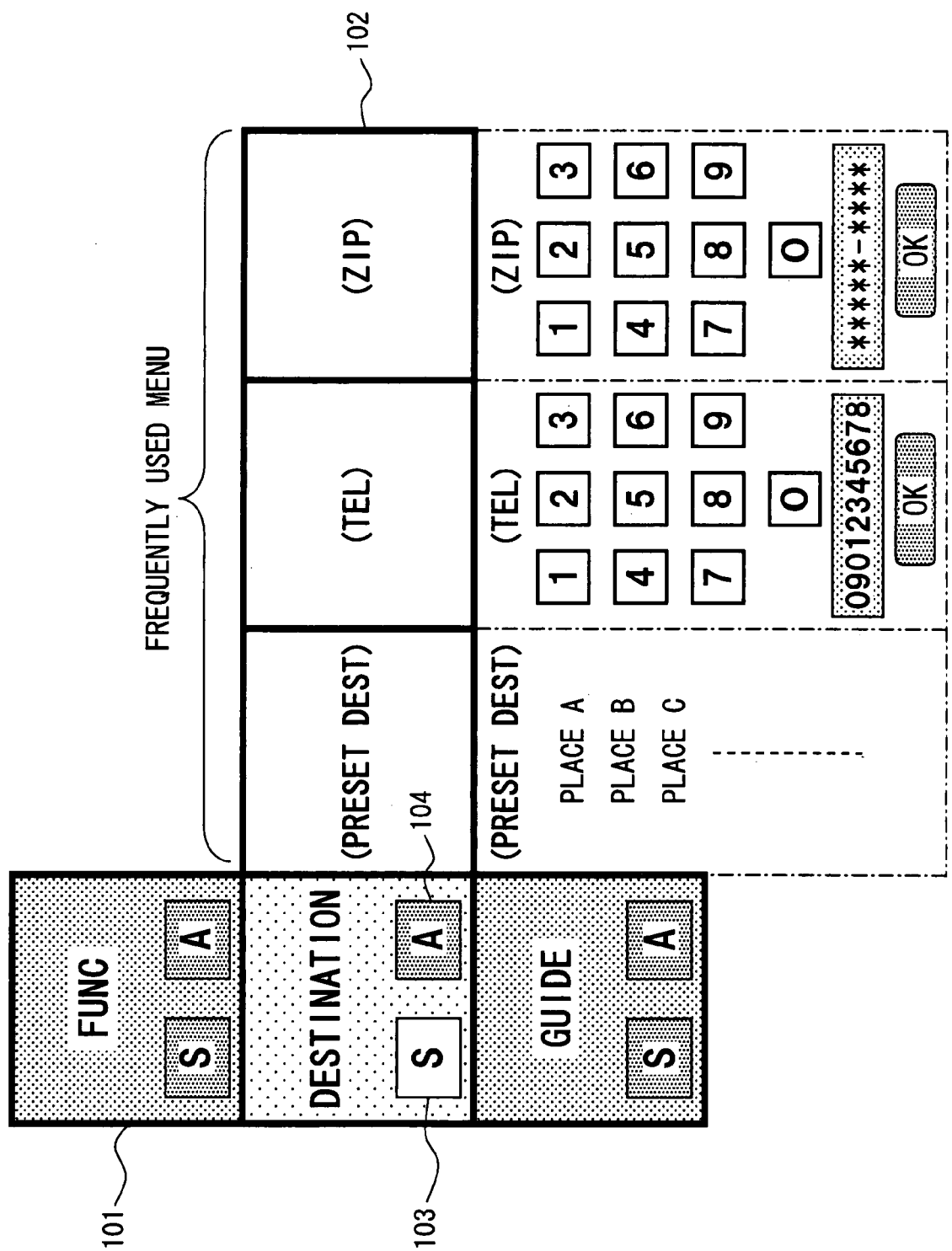
FIG. 18 shows a final shape of an unfolded (disassembled) polyhedron displaying the upper menu items.

When one of the menu items displayed on the surfaces of the cube as shown in FIG. 17A is selected by the pointer 35, the cube is unfolded (disassembled) from FIG. 17A to FIG. 18 via FIG. 17B. Then, the cube changes to a two-dimensional shape having a first line 101 and a second line 102 extending from the center of the first line 101, so that menu items subordinate to the selected upper menu item are displayed. For example, in the two-dimensional shape after the change, middle menu items belonging to the second hierarchy are displayed on the first line 101, and lower menu items belonging to the third hierarchy and subordinate to the middle menu item positioned to the center of the first line 101 are displayed on the second line 102.

As described above, the cube is unfolded into the first line 101 and second line 102 to display the middle items on the first line 101 and to display the lower menu items subordinate to the middle menu item displayed on the center of the first line 101, so that the hierarchy relationship between the middle menu item and lower menu items can be displayed understandably to the user.

When one of the lower menu items of the second line 102 is selected by the pointer 35 in the screen as shown in FIG. 18, the selected lower menu item is enlarged at a predetermined enlargement scale. Selection areas in the selected lower menu item can be easily specified by pointing. When, in the first line 101, an image of the middle menu item displayed on a position other than the center is selected, the order of the middle menu items is changed so that the selected middle menu item is positioned on the center in the first line 101.

As shown in FIG. 18, in each of the images of the middle menu items displayed in the first line 101, a selection display switch (S-switch) 103 for displaying only lower items having high usage frequencies and an all-display switch (A-switch) 104 for displaying all the lower menu items are provided. FIG. 18 shows a display example of the lower menu items when the S-switch 103 is selected. At this time, when the A-switch 104 is selected by the pointer 35, all the lower menu items are displayed on the screen. In other words, grids increase in number in the second line 102 to display the lower menu items corresponding to all the functions available for the destination setting.

As described above, the display of all the lower menu items and the display of only the lower menu items having high usage frequencies can be switched. Accordingly, all the lower menu items subordinate to the middle menu item on the center in the first line 101 can be recognized. Additionally, a lower menu item having a high usage frequency can be easily searched by displaying only the lower menu items having high usage frequencies.

Instead of providing both the S-switch 103 and A-switch 104, only the A-switch 104 may be provided. When the image display screen other than the display area of the A-switch 104 is specified in the area of the middle menu item by the pointer 35, the same display process as when the S-switch is selected may be executed. When the A-switch 104 is selected, all the lower menu items may be displayed.

Figure 19:
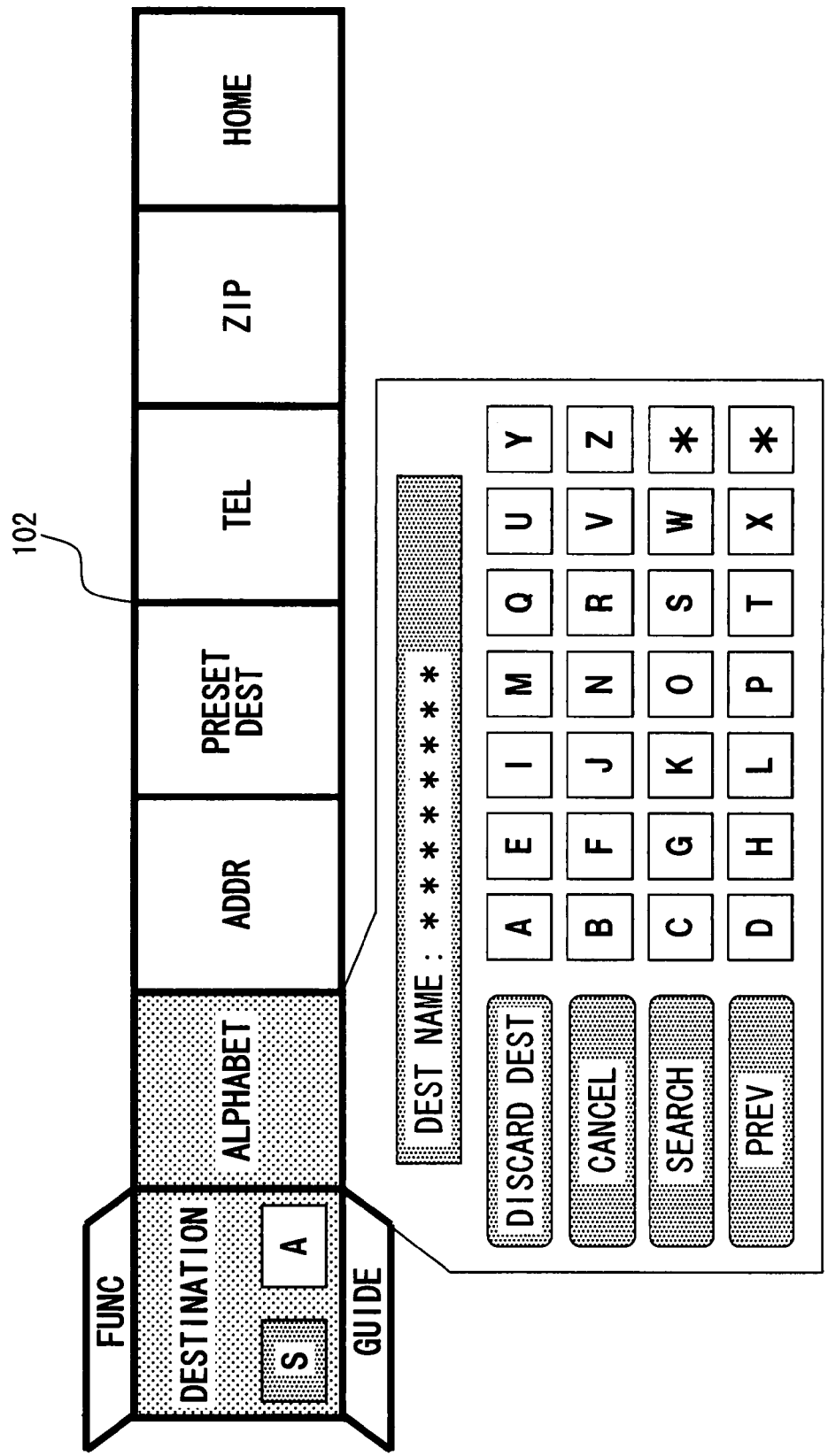
FIG. 19 shows a state where all lower menu items are displayed on a second line 102.

As shown in FIG. 18, when only the lower menu items having high usage frequencies are displayed in the second line 102, a larger area can be secured. Accordingly, a selection area where required data is specified and inputted in each lower menu item may be displayed on an area next to the second line 102. As a result, when the screen of FIG. 18 is displayed, the user can specify and input the required data on the screen. As shown in FIG. 19, when all the lower menu items are displayed in the second line 102, the lower menu item having the highest usage frequency is displayed on the top of the second line 102, the top being nearest to the first line 101. Then, selection areas of this lower menu item may be displayed above or below the second line 102 for specifying and inputting the required data. In this case, when another lower menu item is specified by the pointer 35, the selected lower menu item moves to the top of the second line 102, and selection areas of the selected lower menu item are displayed above or below the second line 102.

As described above, by first displaying only the upper menu items in the display screen of the image display device 12, the user easily views each upper menu item, and easily finds the upper menu item including a target function as the lower menu item. When one of the upper menu items is selected, the shape of the cube whose surfaces display the upper menu items is unfolded, and the lower menu items are displayed on the unfolded shape. Accordingly, the user can recognize that the lower menu items are displayed, while enjoying the change of the display.

Instead of on the cube, the upper menu items may be displayed on another polyhedron.

Third Embodiment

Next, an image display control device of a third embodiment of the present invention is explained. In the image display control device of the second embodiment, at first, the upper menu items are displayed on the surfaces of the cube. Then, when one of the upper menu items is selected, the middle menu items and lower menu items are displayed on the two-dimensional surfaces of the unfolded cube.

Figure 20A:
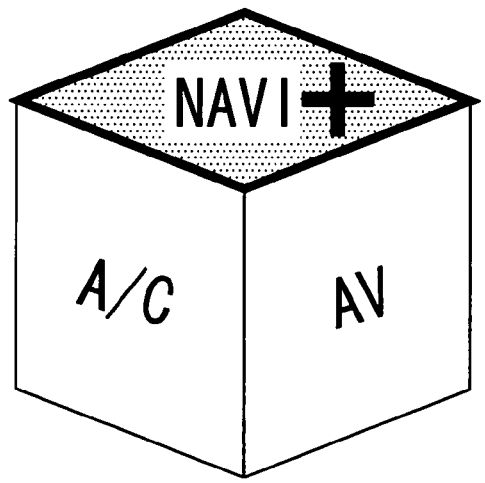
FIGS. 20A, 20B, and 20C respectively show menu screens of hierarchies displayed by an image display device of a third embodiment.

In the image display control device of this embodiment, the display of the menu items are in common with that of the second embodiment. As shown in FIG. 20A, the upper menu items are displayed on surfaces of a cube.

Figure 20B:
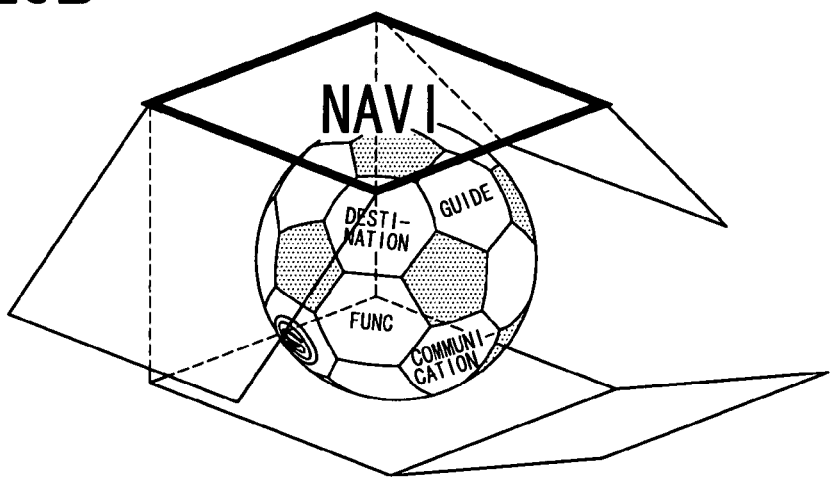

When one of the upper menu items is selected, the cube is unfolded (disassembled) as shown in FIG. 20B. Then, the display changes so that a different polyhedron appears (in this embodiment, a football) from inside the cube. The middle menu items belonging to the second hierarchy subordinate to the selected upper menu item are assigned to surfaces of the polyhedron, so that the middle menu items are displayed stereoscopically.

The menu items of each hierarchy are displayed on different shaped polyhedrons, so that the user can determine to which hierarchy the menu items belong intuitively.

Figure 20C:
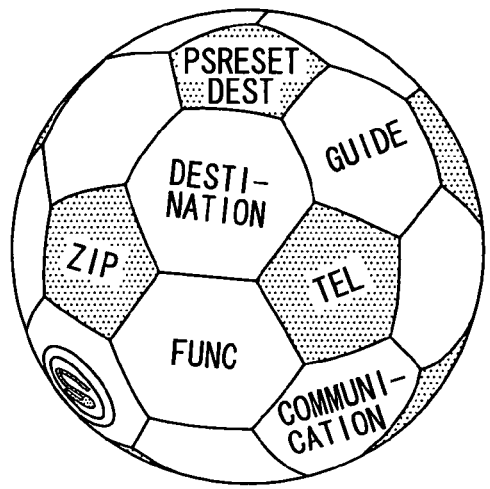

When one of the middle menu items is selected, the lower menu items subordinate to the selected middle menu item ("destination setting" in FIG. 20C) are displayed on surfaces around the surface of the selected middle menu item as shown in FIG. 20C. More specifically, in the example of FIG. 20C, the middle menu items (destination setting, guide setting, function setting, and communications setting) of the second hierarchy are assigned to white portions of the football. The lower upper menu items relating to the "destination setting" and having high usage frequencies (zip codes, registered points, and phone numbers) are assigned to black portions of the football.

Alternative Embodiment

The scope of the invention is not limited to only the above embodiments, but includes various modifications which can achieve functions of the features of the invention.

Figure 16:
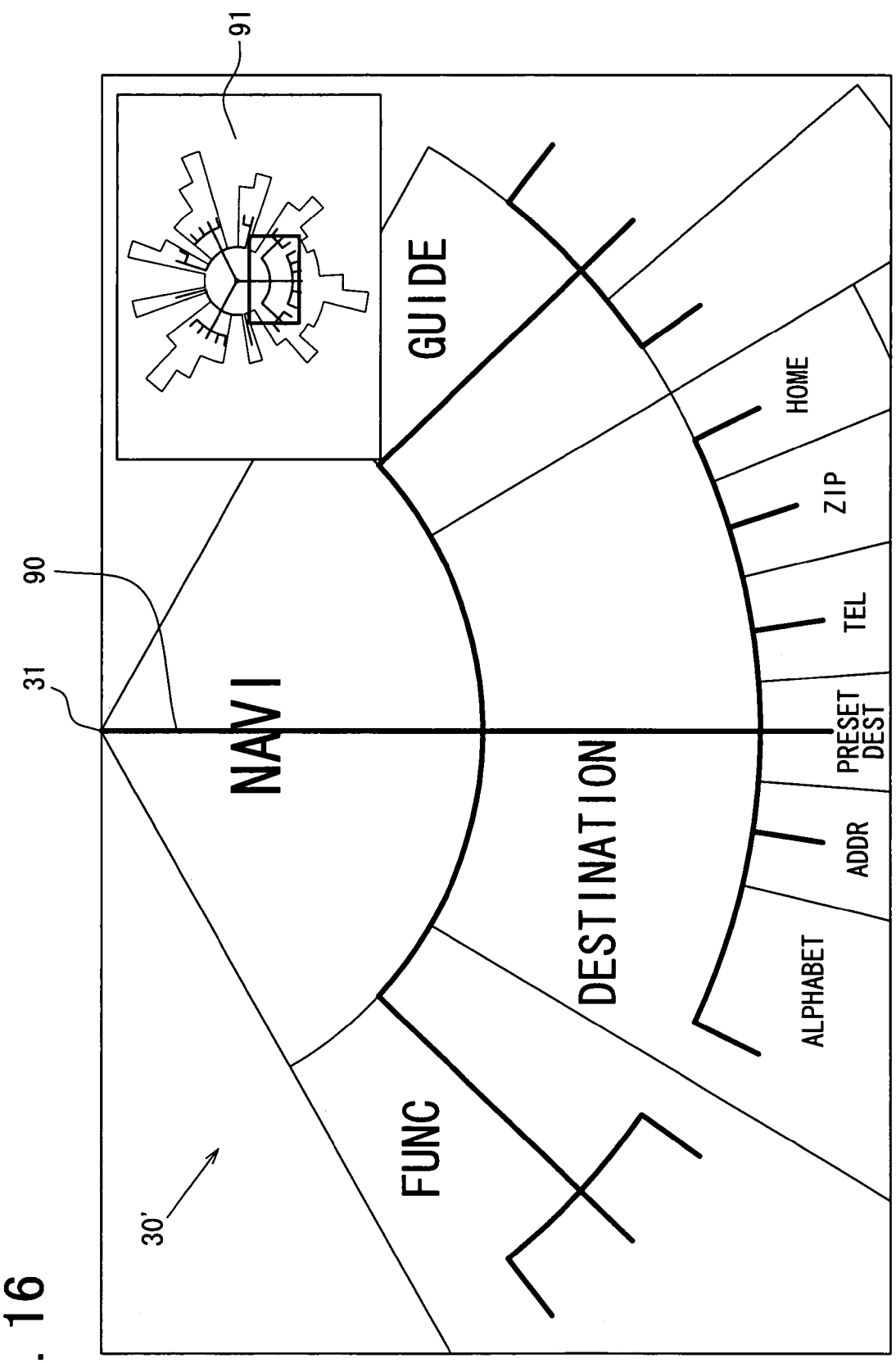
FIG. 16 shows another example of the menu map.

For example, in the first embodiment, the control circuit 19 may allow a line 90 extending from the origin 31 along the tree structure of the menu items to be displayed on the menu map, as shown in FIG. 16. In this case, borders between each menu item may not be provided. The menu items may be distinguished by colors, or may not be distinguished by colors. As shown in FIG. 16, when part of the menu map is enlarged on the display screen, an image 91 showing the reduced entire menu map may be displayed on the edge of the display screen.

Like in the above embodiment, an enlargement scale of the menu map may not be changed automatically in accordance with a position of the pointer 35. For example, each upper menu item has a function, which may enlarge the menu map at the maximum enlargement scale at which the substantial whole of the upper menu item and the menu items subordinate to the upper menu item can be displayed. The control circuit 19 may allow the menu item nearest in the upper menu items to the pointer 35 to be a focused target. When an upper menu item is focused, and when the user determines the selection of the upper menu item, a function corresponding to the upper menu item may be executed.

Accordingly, when searching a target lower image, the user operates the operating device to achieve a function corresponding to an upper image representing a function of the lower image, so that the lower image and a periphery of the image are enlarged on the image display device. As a result, the user can finds the lower image corresponding to a target function more easily.

At this time, the control circuit 19 may operate so that a menu item of the first hierarchy is focused when the pointer 35 is on the first layer, a menu item of the second hierarchy is focused when the pointer 35 is on the second layer, and a menu item of the third hierarchy is focused when the pointer 35 is on the third layer.

In other words, the control circuit 19 achieves functions corresponding to the menu items of the first and second hierarchies when the pointer 35 is within a standard distance from the origin 31, and achieves a function corresponding to the menu items of the third hierarchy when the pointer 35 is away from the origin 31 by over the standard distance.

The control circuit 19 uses multiple menu map data in the data storage section 18 variously. For example, the control circuit 19 may specify a passenger in accordance with user certification information inputted to the operating section 13 and with the information about a user certification electronic key acquired via the interface 15, select menu map data corresponding to the specified passenger from the multiple menu map data, and use the menu map data. The control circuit 19 may select and use one of the multiple menu map data in accordance with the selection by the user using the operating section 13. The control circuit 19 may select one of the multiple menu map data in accordance with current weather information. The weather information may be received from a weather information transmitting center by radio communications unit, or produced in accordance with signals from a raindrop sensor mounted in the user's vehicle.

An operation-prohibition indicating image corresponding to a function prohibited from being executed by the user when the vehicle is running is predetermined in multiple upper images and multiple lower images displayed on the display screen of the image display device 12. When the vehicle is running, the control circuit 19 may allows an appearance of the operation-prohibition indicating image to be different from an operation-permission indicating image corresponding to a function executable by an instruction by the user. Accordingly, the user can recognize which function is inoperable when the vehicle is running.

The changing of the appearance of the images includes deleting of an image corresponding to the operation-prohibition indicating image. The operation-prohibition indicating image may not be displayed because a function corresponding to the operation-prohibition indicating image cannot be operated.

The operation-prohibition indicating image may vary between on the menu display screen for receiving an instruction by the hand of the user and on the menu display screen for receiving an instruction by speech of the user. The reason is as follows. The operation-prohibition indicating image is to be displayed when an instruction is done by the hand of the user because several operations for the instruction are necessary. On the other hand, the user does not need to watch the screen carefully when an instruction is done by speech of the user. The image to be the operation-prohibition indicating image varies in some cases.

A camera for picking up the front, side, and back of the vehicle may be mounted to the vehicle, and pick-up images from the camera may be displayed on the image display device 12. In this case, since the pick-up images are used for confirming the safety and surroundings of the vehicle, the images precede the menu display screen.

Even while the images picked up by the camera and showing the surroundings of the vehicle are displayed in the image display device 12, an instruction by speech of the user can be preferably received. This is because the user can operate instructions by speech even when the menu screen having multiple images corresponding to functions are not displayed. When the display of the pick-up images from the camera is completed, and the menu display screen is displayed, the screen reflecting the speech instructions during the display of the pick-up images is preferably displayed to improve the convenience of the user.

What is claimed is:

1. An image display control device comprising:
   a display control unit for displaying, in a single menu map, a plurality of upper images in a plurality of upper areas in a display screen of an image display device, together with a plurality of lower images in a plurality of lower areas in the display screen;
   a pointed portion specifying unit for specifying a pointed portion in the display screen in accordance with an operation of an operating device by a user; and
   a function achieving unit for achieving a function corresponding to a lower image determined in the plurality of lower images in accordance with the pointed portion specified by the pointed portion specifying unit,
   wherein the plurality of lower areas are respectively contained in a plurality of lower angle areas contained in any one of a plurality of upper angle ranges around an origin in the display screen,
   the plurality of upper areas are respectively contained in the plurality of upper angle ranges, each of the plurality of upper areas is nearer to the origin than a plurality of subordinate lower areas of the plurality of lower areas, the subordinate lower areas being contained in the upper angle range corresponding to the each of the plurality of upper areas, and
   each of the plurality of upper images is an image that represents functions of the subordinate lower areas of the each of the plurality of the upper areas corresponding to the each of the plurality of upper images, and
   at an enlargement scale based on a position of the pointed portion specified by the pointed portion specifying unit, part of the plurality of upper images and the plurality of lower images, the part of both of the upper images and the lower images being near the position of the pointed portion, is enlarged to preclude a non-near part from viewing in the display screen.

2. The image display control device of claim 1, wherein, as a distance between the position of the pointed portion and the origin increases, the enlargement scale increases.

3. The image display control device of claim 1, wherein, when the pointed portion pointed in the display screen in accordance with the operation by the user extends over the plurality of partial areas, the display control unit enlarges the plurality of partial areas over which the pointed portion extends.

4. The image display control device of claim 1, wherein the display control unit displays the plurality of upper images and the plurality of lower images in the display screen together with background images behind the upper images and the lower images, and
   the image display control device comprises background image control unit for controlling content of the background images displayed by the display control unit in accordance with a position of the pointed portion specified by the pointed portion specifying unit.

5. The image display control device of claim 1 further comprising:
   an additional function detecting unit for detecting an additional function which becomes executable,
   wherein the display control unit allows the image display device to display an additional image corresponding to the additional function detected by the additional function detecting unit in addition to the plurality of images, and
   the function achieving unit achieves the additional function when an image based on the pointed portion specified by the pointed portion specifying unit is the additional image.

6. The image display control device of claim 1, wherein the function achieving unit records a history of achieved functions in a storage medium, and
   the display control unit highlights the plurality of images, as the number of executions of the function corresponding to each of the images increases, in accordance with the history of the function, the history being recorded in the storage medium.

7. The image display control device of claim 6, wherein the operating device includes a first operating device for receiving an instruction by a hand of a user and a second operating device for receiving an instruction by speech of the user,
   the function achieving unit records a history of functions achieved by the instruction by the hand of the user and a history of functions achieved by the speech of the user separately, and
   the display control unit displays the plurality of images when the instruction is done by the user by use of any one of the first operating device and the second operating device so that images corresponding to functions having high achievement frequencies are highlighted in accordance with the history of the used operating device.

8. The image display control device of claim 6, wherein the operating device includes a first operating device for receiving an instruction by a hand of a user and a second operating device for receiving an instruction by speech of the user,
   the function achieving unit records a history of functions achieved by the hand of the user and a history of functions achieved by the speech of the user separately, and
   the display control unit displays an image corresponding to a function achieved by the hand of the user and having a high usage frequency and an image corresponding to a function achieved by the speech of the user and having a high usage frequency differently.

9. The image display control device of claim 1, wherein the function achieving unit achieves a function corresponding to an image based on a pointed portion specified by the pointed portion specifying unit, the image being in the plurality of lower images and the plurality of upper images.

10. The image display control device of claim 9, wherein each function corresponding to each of the plurality of upper images enlarges subordinate lower areas of an upper area corresponding to the each of the upper images in the image display device.

11. The image display control device of claim 9, wherein the function achieving unit achieves a function corresponding to an upper image nearest to the pointed portion specified by the pointed portion specifying unit, the upper image being in the plurality of upper images, when the pointed portion is within a standard distance from the origin, and achieves a function corresponding to a lower image nearest to the pointed portion specified by the pointed portion specifying unit, the lower image being in the plurality of lower images, when the pointed portion is outside the standard distance from the origin.

12. An image display control device comprising:
a display control unit for displaying a plurality of upper images in a plurality of upper areas in a display screen of an image display device, and displaying a plurality of lower images in a plurality of lower areas in the display screen;
a pointed portion specifying unit for specifying a pointed portion in the display screen in accordance with an operation of an operating device by a user; and
a function achieving unit for achieving a function corresponding to a lower image determined in the plurality of lower images in accordance with the pointed portion specified by the pointed portion specifying unit,
wherein the plurality of lower areas are respectively contained in a plurality of lower angle areas contained in any one of a plurality of upper angle ranges around an origin in the display screen,
the plurality of upper areas are respectively contained in the plurality of upper angle ranges, each of the plurality of upper areas is nearer to the origin than a plurality of subordinate lower areas of the plurality of lower areas, the subordinate lower areas being contained in the upper angle range corresponding to the each of the plurality of upper areas, and
each of the plurality of upper images is an image that represents functions of the subordinate lower areas of the each of the plurality of the upper areas corresponding to the each of the plurality of upper images,
wherein one of the plurality of lower images corresponds to a function for adding a plurality of types of characters to a character string to construct the character string,
the function achieving unit achieves the function corresponding to the specific lower image to construct an incomplete character string, and after achieving the functions corresponding to the lower images other than the specific lower image, the function achieving unit adds a character to the incomplete character string when specifying the specific lower image in accordance with the pointed portion specified by the pointed portion specifying unit.

13. An image display control device comprising:
a display control unit for displaying a plurality of upper images in a plurality of upper areas in a display screen of an image display device, and displaying a plurality of lower images in a plurality of lower areas in the display screen;
a pointed portion specifying, unit for specifying a pointed portion in the display screen in accordance with an operation of an operating device by a user; and
a function achieving unit for achieving a function corresponding to a lower image determined in the plurality of lower images in accordance with the pointed portion specified by the pointed portion specifying unit,
wherein the plurality of lower areas are respectively contained in a plurality of lower angle areas contained in any one of a plurality of upper angle ranges around an origin in the display screen,
the plurality of upper areas are respectively contained in the plurality of upper angle ranges, each of the plurality of upper areas is nearer to the origin than a plurality of subordinate lower areas of the plurality of lower areas, the subordinate lower areas being contained in the upper angle range corresponding to the each of the plurality of upper areas, and
each of the plurality of upper images is an image that represents functions of the subordinate lower areas of the each of the plurality of the upper areas corresponding to the each of the plurality of upper images,
wherein the image display device is mounted to a vehicle, an operation-prohibition indicating image corresponding to a function prohibited from being operated by the user when the vehicle is running is predetermined in the plurality of upper images and the plurality of lower images displayed in the display screen of the image display device, and
the display control unit allows a display feature of the operation-prohibition indicating image to differ from an operation-permission indicating image corresponding to a function executable in response to an instruction by the user.

14. The image display control device of claim 13, wherein the allowing the display feature to differ includes deleting a display of the operation-prohibition indicating image.

15. The image display control device of claim 13, wherein, when the operating device includes a first operating device for receiving an instruction by a hand of the user and a second operating device for receiving an instruction by speech of the user, the operation-prohibition indicating image varies between when the first operating device is used and when the second operating device is used.

16. An image display control device comprising:
a display control unit for displaying a plurality of upper images in a plurality of upper areas in a display screen of an image display device, and displaying a plurality of lower images in a plurality of lower areas in the display screen;
a pointed portion specifying unit for specifying a pointed portion in the display screen in accordance with an operation of an operating device by a user; and
a function achieving unit for achieving a function corresponding to a lower image determined in the plurality of lower images in accordance with the pointed portion specified by the pointed portion specifying unit,
wherein the plurality of lower areas are respectively contained in a plurality of lower angle areas contained in any one of a plurality of upper angle ranges around an origin in the display screen, the plurality of upper areas are respectively contained in the plurality of upper angle ranges, each of the plurality of upper areas is nearer to the origin than a plurality of subordinate lower areas of the plurality of lower areas, the subordinate lower areas being contained in the upper angle range corresponding to the each of the plurality of upper areas, and each of the plurality of upper images is an image that represents functions of the subordinate lower areas of the each of the plurality of the upper areas corresponding to the each of the plurality of upper images, wherein the function achieving unit achieves a function corresponding to an image based on a pointed portion specified by the pointed portion specifying unit, the image being in the plurality of lower images and the plurality of upper per images, wherein, when the image display device can display an image from a pickup unit for picking up a surrounding of a vehicle, and the operating device includes a second operating device for receiving an instruction by speech of a user, the image display device receives instructions by the user via the second operating device while the image from the pickup unit is displayed in the image display device, the pointed portion specifying unit specifies images corresponding to the instructions by the user in the upper images and lower images, the function achieving unit achieves functions corresponding to the specified images, and, when a plurality of images corresponding to the functions are displayed after a completion of display of the image from the pickup unit in the image display device, a screen reflecting the instructions before and including the completion is displayed in the image display device.

17. A program stored in a memory medium for operating a computer comprising steps of:

displaying, in a single menu map, a plurality of upper images in a plurality of upper areas in a display screen of an image display device together with a plurality of lower images in a plurality of lower areas in the display screen;

specifying a pointed portion in the display screen in accordance with an operation of an operating device by a user; and achieving a function corresponding to a lower image determined in the plurality of lower images in accordance with the pointed portion specified by a step for specifying the pointed portion, wherein the plurality of lower areas are respectively contained in a plurality of lower angle areas contained in any one of a plurality of upper angle ranges around an origin in the display screen, the plurality of upper areas are respectively contained in the plurality of upper angle ranges, each of the plurality of upper areas is nearer to the origin than a plurality of subordinate lower areas of the plurality of lower areas, the subordinate lower areas being contained in the upper angle range corresponding to the each of the plurality of upper areas, and each of the plurality of upper images is an image that represents functions of the subordinate lower areas of the each of the plurality of the upper areas corresponding to the each of the plurality of upper images, and at an enlargement scale based on a position of the pointed portion specified by the pointed portion specifying unit, part of the plurality of upper images and the plurality of lower images, the part of both of the upper images and the lower images being near the position of the pointed portion, is enlarged to preclude a non-near part from viewing in the display screen.

* * * * *